US009633362B2

(12) United States Patent
Morris et al.

(10) Patent No.: US 9,633,362 B2
(45) Date of Patent: Apr. 25, 2017

(54) SYSTEM AND METHOD FOR CREATING RESERVATIONS

(71) Applicant: American Express Travel Related Services Company, Inc., New York, NY (US)

(72) Inventors: Michael Morris, New York, NY (US); Stephanie Schultz, New York, NY (US); Ilias Tsangaris, New York, NY (US); David Wolf, Brooklyn, NY (US); Michael Yu, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 13/889,307

(22) Filed: May 7, 2013

(65) Prior Publication Data

US 2014/0081782 A1    Mar. 20, 2014

Related U.S. Application Data

(60) Provisional application No. 61/754,354, filed on Jan. 18, 2013, provisional application No. 61/701,683, (Continued)

(51) Int. Cl.
*G06Q 40/00* (2012.01)
*G06Q 30/06* (2012.01)
(Continued)

(52) U.S. Cl.
CPC ......... *G06Q 30/0239* (2013.01); *G06Q 20/12* (2013.01); *G06Q 20/387* (2013.01);
(Continued)

(58) Field of Classification Search
USPC ............................................. 705/21; 707/749
See application file for complete search history.

(56) References Cited

U.S. PATENT DOCUMENTS

| 4,833,308 A | 5/1989 | Humble |
| 4,882,675 A | 11/1989 | Nichtberger et al. |

(Continued)

FOREIGN PATENT DOCUMENTS

| WO | 0186378 | 11/2001 |
| WO | 2012024109 | 2/2012 |

(Continued)

OTHER PUBLICATIONS

USPTO; Office Action dated May 23, 2013 in U.S. Appl. No. 13/734,693.

(Continued)

*Primary Examiner* — Talia Crawley
(74) *Attorney, Agent, or Firm* — Snell & Wilmer L.L.P.

(57) ABSTRACT

The systems, methods, and computer program products (collectively "systems") described herein are generally configured to monitor actions in digital channels. More specifically, the systems are capable of creating reservations for items and initiating payments for the items based on actions or information received from the digital channel. The systems are capable of syncing transaction accounts with various digital channels. Moreover, the systems are capable of initiating or completing transaction based on user information. The systems may also be capable of providing rewards based on activities or accomplishments in the digital channels. Moreover, the systems may be capable of verifying activities based on transaction information.

20 Claims, 16 Drawing Sheets

Related U.S. Application Data filed on Sep. 16, 2012, provisional application No. 61/701,685, filed on Sep. 16, 2012, provisional application No. 61/701,686, filed on Sep. 16, 2012, provisional application No. 61/701,688, filed on Sep. 16, 2012.

(51) Int. Cl.
  *G06Q 30/02* (2012.01)
  *G06Q 20/40* (2012.01)
  *G06Q 20/12* (2012.01)
  *G06Q 20/38* (2012.01)

(52) U.S. Cl.
  CPC ........ *G06Q 20/405* (2013.01); *G06Q 30/0633* (2013.01); *G06Q 30/0637* (2013.01)

(56) References Cited

U.S. PATENT DOCUMENTS

| | | |
|---|---|---|
| 5,025,372 A | 6/1991 | Burton et al. |
| 5,467,269 A | 11/1995 | Flaten |
| 5,471,669 A | 11/1995 | Lidman |
| 5,729,693 A | 3/1998 | Holda-Fleck |
| 5,918,211 A | 6/1999 | Sloane |
| 5,923,016 A | 7/1999 | Fredregill et al. |
| 5,948,040 A | 9/1999 | DeLorme et al. |
| 5,953,706 A | 9/1999 | Patel |
| 6,009,411 A | 12/1999 | Kepecs |
| 6,018,718 A | 1/2000 | Walker et al. |
| 6,035,280 A | 3/2000 | Christensen |
| 6,039,244 A | 3/2000 | Finsterwald |
| 6,222,914 B1 | 4/2001 | McMullin |
| 6,266,649 B1 | 7/2001 | Linden et al. |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,343,317 B1 | 1/2002 | Glorikian |
| 6,360,167 B1 | 3/2002 | Millington et al. |
| 6,370,514 B1 | 4/2002 | Messner |
| 6,381,603 B1 | 4/2002 | Chan et al. |
| 6,414,635 B1 | 7/2002 | Stewart et al. |
| 6,430,539 B1 | 8/2002 | Lazarus et al. |
| 6,434,534 B1 | 8/2002 | Walker et al. |
| 6,542,814 B2 | 4/2003 | Polidi et al. |
| 6,584,448 B1 | 6/2003 | Laor |
| 6,587,835 B1 | 7/2003 | Treyz et al. |
| 6,606,619 B2 | 8/2003 | Ortega et al. |
| 6,691,915 B1 | 2/2004 | Thaxton et al. |
| 6,738,711 B2 | 5/2004 | Ohmura et al. |
| 6,748,365 B1 | 6/2004 | Quinlan et al. |
| 6,882,290 B2 | 4/2005 | French et al. |
| 6,883,708 B1 | 4/2005 | Fiedler et al. |
| 6,904,408 B1 | 6/2005 | McCarthy et al. |
| 6,915,265 B1 | 7/2005 | Johnson |
| 6,937,995 B1 | 8/2005 | Kepecs |
| 7,003,476 B1 | 2/2006 | Samra et al. |
| 7,010,497 B1 | 3/2006 | Nyhan et al. |
| 7,016,856 B1 | 3/2006 | Wiggins |
| 7,016,860 B2 | 3/2006 | Modani et al. |
| 7,054,830 B1 | 5/2006 | Eggleston et al. |
| 7,072,851 B1 | 7/2006 | Wilcox et al. |
| 7,107,238 B2 | 9/2006 | Hatakama et al. |
| 7,120,591 B1 | 10/2006 | Solomon et al. |
| 7,139,793 B2 | 11/2006 | Lala et al. |
| 7,146,328 B1 | 12/2006 | Solomon et al. |
| 7,165,037 B2 | 1/2007 | Lazarus et al. |
| 7,302,429 B1 | 11/2007 | Wanker |
| 7,392,224 B1 | 6/2008 | Bauer et al. |
| 7,428,505 B1 | 9/2008 | Levy et al. |
| 7,430,521 B2 | 9/2008 | Walker et al. |
| 7,455,226 B1 | 11/2008 | Hammond et al. |
| 7,472,073 B1 | 12/2008 | Masi |
| 7,493,268 B2 | 2/2009 | Kepros et al. |
| 7,496,520 B1 | 2/2009 | Handel et al. |
| 7,499,889 B2 | 3/2009 | Golan et al. |
| 7,506,805 B1 | 3/2009 | Chakravarthy |
| 7,512,551 B2 | 3/2009 | Postrel |
| 7,596,566 B1 | 9/2009 | Patwardhan |
| 7,599,858 B1 | 10/2009 | Grady et al. |
| 7,618,318 B2 | 11/2009 | Ciancio et al. |
| 7,630,935 B2 | 12/2009 | Loeger et al. |
| 7,647,278 B1 | 1/2010 | Foth et al. |
| 7,653,572 B1 | 1/2010 | Thompson |
| 7,660,743 B1 | 2/2010 | Messa et al. |
| 7,665,660 B2 | 2/2010 | Degliantoni et al. |
| 7,668,749 B2 | 2/2010 | Kepros et al. |
| 7,676,467 B1 | 3/2010 | Kozyrczak et al. |
| 7,681,786 B1 | 3/2010 | Chakravarthy |
| 7,706,808 B1 | 4/2010 | Aggarwal et al. |
| 7,711,586 B2 | 5/2010 | Aggarwal et al. |
| 7,734,486 B2 | 6/2010 | Mortimore, Jr. |
| 7,739,134 B2 | 6/2010 | Mortimore, Jr. |
| 7,742,954 B2 | 6/2010 | Handel et al. |
| 7,743,002 B2 | 6/2010 | Hernandez |
| 7,747,524 B2 | 6/2010 | Brown |
| 7,752,328 B2 | 7/2010 | Mortimore, Jr. et al. |
| 7,765,119 B2 | 7/2010 | Messa |
| 7,788,141 B1 | 8/2010 | Sim |
| 7,797,199 B2 | 9/2010 | Forshaw et al. |
| 7,801,760 B2 | 9/2010 | Handel et al. |
| 7,806,328 B2 | 10/2010 | Chakravarthy |
| 7,814,029 B1 | 10/2010 | Siegel |
| 7,844,488 B2 | 11/2010 | Merriman et al. |
| 7,844,490 B2 | 11/2010 | Patterson |
| 7,865,513 B2 | 1/2011 | Welch et al. |
| 7,870,022 B2 * | 1/2011 | Bous ................ G06Q 30/02 705/14.34 |
| 7,899,704 B1 | 3/2011 | Thompson |
| 7,925,540 B1 | 4/2011 | Orttung et al. |
| 7,933,810 B2 * | 4/2011 | Morgenstern ......... G06Q 30/02 705/26.1 |
| 7,937,330 B2 | 5/2011 | Handel et al. |
| 7,941,374 B2 | 5/2011 | Orttung et al. |
| 7,958,017 B1 | 6/2011 | Rempe et al. |
| 7,962,381 B2 | 6/2011 | Handel et al. |
| 7,966,213 B2 | 6/2011 | Messa et al. |
| 7,970,666 B1 | 6/2011 | Handel |
| 7,991,664 B1 | 8/2011 | Stone |
| 8,073,719 B2 | 12/2011 | Orttung et al. |
| 8,078,496 B2 | 12/2011 | Postrel |
| 8,082,270 B2 | 12/2011 | Goyal |
| 8,090,707 B1 | 1/2012 | Orttung et al. |
| 8,095,402 B2 | 1/2012 | Orttung et al. |
| 8,108,304 B2 | 1/2012 | Loeger et al. |
| 8,117,073 B1 | 2/2012 | Orttung et al. |
| 8,121,953 B2 | 2/2012 | Orttung et al. |
| 8,126,771 B2 | 2/2012 | Walker et al. |
| 8,126,776 B2 | 2/2012 | Messa et al. |
| 8,131,588 B2 | 3/2012 | Walker et al. |
| 8,140,387 B2 | 3/2012 | Heywood |
| 8,145,522 B2 | 3/2012 | Warren et al. |
| 8,160,922 B2 | 4/2012 | Postrel |
| 8,170,916 B1 | 5/2012 | Dicker et al. |
| 8,175,926 B1 | 5/2012 | Handel et al. |
| 8,180,682 B2 | 5/2012 | Narayanaswami et al. |
| 8,180,796 B1 | 5/2012 | Mah et al. |
| 8,213,423 B1 | 7/2012 | Breau |
| 8,249,934 B2 | 8/2012 | Agarwal et al. |
| 8,438,061 B2 | 5/2013 | Grimes |
| 8,459,551 B2 | 6/2013 | Lee et al. |
| 8,463,643 B2 | 6/2013 | Bennett |
| 8,463,706 B2 | 6/2013 | Cervenka et al. |
| 8,463,851 B2 | 6/2013 | Bennett et al. |
| 8,468,053 B2 | 6/2013 | Bennett |
| 8,473,334 B2 | 6/2013 | Gibbs et al. |
| 8,484,088 B1 | 7/2013 | Orttung et al. |
| 8,484,093 B2 | 7/2013 | Bennett et al. |
| 8,489,456 B2 | 7/2013 | Burgess et al. |
| 8,494,901 B2 | 7/2013 | Magadi et al. |
| 8,494,914 B2 | 7/2013 | Mesaros |
| 8,504,423 B2 | 8/2013 | Rotbard et al. |
| 8,515,810 B2 | 8/2013 | Grimes |

(56) References Cited

U.S. PATENT DOCUMENTS

| | | | |
|---|---|---|---|
| 8,517,258 B2 | 8/2013 | Taylor et al. | |
| 8,543,470 B2 | 9/2013 | Grady et al. | |
| 8,560,389 B2 | 10/2013 | Burgess et al. | |
| 8,573,477 B2 | 11/2013 | Bennett et al. | |
| 8,573,491 B2 | 11/2013 | Bennett et al. | |
| 8,606,630 B2 | 12/2013 | Fordyce, III et al. | |
| 8,615,426 B2 | 12/2013 | Carlson | |
| 8,621,068 B2 | 12/2013 | Zohar et al. | |
| 8,621,215 B1 * | 12/2013 | Iyer | G06Q 50/01 713/169 |
| 8,626,579 B2 | 1/2014 | Fordyce, III et al. | |
| 8,639,567 B2 | 1/2014 | Winters | |
| 8,650,071 B2 | 2/2014 | Pointer et al. | |
| 8,725,635 B2 * | 5/2014 | Klein | G06Q 20/108 705/35 |
| 8,874,674 B2 * | 10/2014 | Allison | G06Q 50/01 709/203 |
| 9,009,082 B1 | 4/2015 | Marshall et al. | |
| 9,031,866 B1 | 5/2015 | Ng et al. | |
| 9,430,773 B2 | 8/2016 | Aloni et al. | |
| 2001/0014868 A1 | 8/2001 | Herz et al. | |
| 2001/0020242 A1 | 9/2001 | Gupta et al. | |
| 2001/0037254 A1 | 11/2001 | Glikman | |
| 2001/0054003 A1 | 12/2001 | Chien et al. | |
| 2002/0052841 A1 | 5/2002 | Guthrie | |
| 2002/0069079 A1 | 6/2002 | Vega | |
| 2002/0069312 A1 | 6/2002 | Jones | |
| 2002/0082920 A1 | 6/2002 | Austin et al. | |
| 2002/0095357 A1 | 7/2002 | Hunter et al. | |
| 2002/0138343 A1 | 9/2002 | Weatherford et al. | |
| 2002/0178056 A1 | 11/2002 | Lim | |
| 2003/0004802 A1 | 1/2003 | Callegari | |
| 2003/0027630 A1 | 2/2003 | Kelly et al. | |
| 2003/0028518 A1 * | 2/2003 | Mankoff | G06F 17/30011 |
| 2003/0033211 A1 | 2/2003 | Haines et al. | |
| 2003/0061093 A1 | 3/2003 | Todd | |
| 2003/0078832 A1 | 4/2003 | Alvarez et al. | |
| 2003/0208442 A1 | 11/2003 | Cockrill et al. | |
| 2003/0233278 A1 | 12/2003 | Marshall | |
| 2004/0006509 A1 | 1/2004 | Mannik et al. | |
| 2004/0039686 A1 | 2/2004 | Klebenoff | |
| 2004/0098326 A1 | 5/2004 | James | |
| 2004/0122736 A1 | 6/2004 | Strock et al. | |
| 2004/0153389 A1 | 8/2004 | Lortscher | |
| 2004/0225509 A1 | 11/2004 | Andre et al. | |
| 2004/0225573 A1 | 11/2004 | Ling | |
| 2004/0243468 A1 | 12/2004 | Cohagan et al. | |
| 2005/0010394 A1 | 1/2005 | Bergeron | |
| 2005/0010428 A1 | 1/2005 | Bergeron | |
| 2005/0010472 A1 | 1/2005 | Quatse et al. | |
| 2005/0021401 A1 | 1/2005 | Postrel | |
| 2005/0033583 A1 | 2/2005 | Bergeron | |
| 2005/0033605 A1 | 2/2005 | Bergeron | |
| 2005/0065848 A1 | 3/2005 | Mitchell et al. | |
| 2005/0071225 A1 | 3/2005 | Bortolin et al. | |
| 2005/0071227 A1 | 3/2005 | Hammad et al. | |
| 2005/0071228 A1 | 3/2005 | Bortolin et al. | |
| 2005/0071230 A1 * | 3/2005 | Mankoff | G06F 17/30011 705/14.15 |
| 2005/0096976 A1 | 5/2005 | Nelms | |
| 2005/0149394 A1 | 7/2005 | Postrel | |
| 2005/0159996 A1 | 7/2005 | Lazarus | |
| 2005/0192863 A1 | 9/2005 | Mohan | |
| 2005/0240477 A1 | 10/2005 | Friday et al. | |
| 2005/0246272 A1 | 11/2005 | Kitada et al. | |
| 2005/0273388 A1 | 12/2005 | Roetter | |
| 2006/0004633 A1 | 1/2006 | Ashbaugh | |
| 2006/0026067 A1 | 2/2006 | Nicholas et al. | |
| 2006/0041480 A1 | 2/2006 | Briggs | |
| 2006/0053056 A1 | 3/2006 | Alspach-Goss et al. | |
| 2006/0064372 A1 | 3/2006 | Gupta | |
| 2006/0074749 A1 | 4/2006 | Kline | |
| 2006/0076400 A1 | 4/2006 | Fletcher | |
| 2006/0085240 A1 | 4/2006 | Salehi-sedeh et al. | |
| 2006/0095434 A1 * | 5/2006 | McCullough | G06F 17/30902 |
| 2006/0111930 A1 | 5/2006 | Ayer et al. | |
| 2006/0116800 A1 | 6/2006 | Obradovich et al. | |
| 2006/0122874 A1 | 6/2006 | Postrel | |
| 2006/0129426 A1 | 6/2006 | Pearson | |
| 2006/0136299 A1 | 6/2006 | Ruhmkorf | |
| 2006/0155603 A1 | 7/2006 | Abendroth et al. | |
| 2006/0155641 A1 | 7/2006 | Postrel | |
| 2006/0167753 A1 | 7/2006 | Teague et al. | |
| 2006/0173672 A1 | 8/2006 | Bergeron | |
| 2006/0178932 A1 | 8/2006 | Lang | |
| 2006/0195359 A1 | 8/2006 | Robinson et al. | |
| 2006/0212355 A1 | 9/2006 | Teague et al. | |
| 2006/0224449 A1 | 10/2006 | Byerley et al. | |
| 2006/0241859 A1 | 10/2006 | Kimchi et al. | |
| 2006/0242011 A1 | 10/2006 | Bell et al. | |
| 2006/0253321 A1 | 11/2006 | Heywood | |
| 2006/0258397 A1 * | 11/2006 | Kaplan | G06Q 20/12 455/556.1 |
| 2006/0259364 A1 | 11/2006 | Strock et al. | |
| 2006/0271552 A1 | 11/2006 | McChesney et al. | |
| 2007/0000927 A1 | 1/2007 | Lambert et al. | |
| 2007/0010942 A1 | 1/2007 | Bill | |
| 2007/0022019 A1 | 1/2007 | Sherwin et al. | |
| 2007/0033104 A1 | 2/2007 | Collins et al. | |
| 2007/0038515 A1 | 2/2007 | Postrel | |
| 2007/0038516 A1 | 2/2007 | Apple et al. | |
| 2007/0050258 A1 | 3/2007 | Dohse | |
| 2007/0061223 A1 | 3/2007 | Rodriguez et al. | |
| 2007/0073599 A1 | 3/2007 | Perry et al. | |
| 2007/0083428 A1 | 4/2007 | Goldstein | |
| 2007/0094114 A1 | 4/2007 | Bufford et al. | |
| 2007/0129995 A1 | 6/2007 | Brandow | |
| 2007/0130000 A1 | 6/2007 | Assanassios | |
| 2007/0136135 A1 | 6/2007 | Loeger et al. | |
| 2007/0146812 A1 | 6/2007 | Lawton | |
| 2007/0150349 A1 | 6/2007 | Handel et al. | |
| 2007/0192178 A1 | 8/2007 | Fung et al. | |
| 2007/0192192 A1 | 8/2007 | Haberman et al. | |
| 2007/0198354 A1 | 8/2007 | Senghore et al. | |
| 2007/0198432 A1 | 8/2007 | Pitroda et al. | |
| 2007/0208879 A1 | 9/2007 | Liu | |
| 2007/0210152 A1 | 9/2007 | Read | |
| 2007/0214040 A1 | 9/2007 | Patel et al. | |
| 2007/0233517 A1 | 10/2007 | Dayal | |
| 2007/0244741 A1 | 10/2007 | Blume et al. | |
| 2007/0244811 A1 | 10/2007 | Tumminaro | |
| 2007/0260513 A1 | 11/2007 | Pavlov | |
| 2007/0260523 A1 | 11/2007 | Schadt et al. | |
| 2007/0288312 A1 | 12/2007 | Wang | |
| 2007/0288372 A1 | 12/2007 | Behar et al. | |
| 2008/0004917 A1 | 1/2008 | Mortimore, Jr. | |
| 2008/0004919 A1 | 1/2008 | Stubbs | |
| 2008/0004980 A1 | 1/2008 | Hernandez | |
| 2008/0005148 A1 | 1/2008 | Welch et al. | |
| 2008/0021772 A1 | 1/2008 | Aloni et al. | |
| 2008/0032720 A1 | 2/2008 | Mamdani et al. | |
| 2008/0033857 A1 | 2/2008 | Moses | |
| 2008/0040211 A1 | 2/2008 | Walker et al. | |
| 2008/0040288 A1 | 2/2008 | Mortimore, Jr. et al. | |
| 2008/0052140 A1 | 2/2008 | Neal et al. | |
| 2008/0052151 A1 | 2/2008 | Xie et al. | |
| 2008/0059220 A1 | 3/2008 | Roth et al. | |
| 2008/0065491 A1 | 3/2008 | Bakman | |
| 2008/0082418 A1 | 4/2008 | Fordyce et al. | |
| 2008/0091445 A1 | 4/2008 | Mihic | |
| 2008/0091528 A1 | 4/2008 | Rampell et al. | |
| 2008/0091537 A1 | 4/2008 | Miller et al. | |
| 2008/0091549 A1 | 4/2008 | Chang et al. | |
| 2008/0091828 A1 | 4/2008 | Mortimore, Jr. | |
| 2008/0092162 A1 | 4/2008 | Lundy et al. | |
| 2008/0109317 A1 | 5/2008 | Singh et al. | |
| 2008/0109489 A1 | 5/2008 | Sherwood | |
| 2008/0120155 A1 | 5/2008 | Pliha | |
| 2008/0126515 A1 | 5/2008 | Chambers et al. | |
| 2008/0147450 A1 | 6/2008 | Mortimore, Jr. | |
| 2008/0147514 A1 | 6/2008 | Shuster et al. | |
| 2008/0147773 A1 | 6/2008 | Aaron | |
| 2008/0154664 A1 | 6/2008 | Kuo et al. | |
| 2008/0162206 A1 | 7/2008 | Mak et al. | |

(56) References Cited

U.S. PATENT DOCUMENTS

| | | |
|---|---|---|
| 2008/0167991 A1 | 7/2008 | Carlson et al. |
| 2008/0189169 A1 | 8/2008 | Turpin et al. |
| 2008/0195475 A1 | 8/2008 | Lambert et al. |
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1 | 9/2008 | Plozay et al. |
| 2008/0255940 A1 | 10/2008 | Perreault et al. |
| 2008/0262925 A1 | 10/2008 | Kim |
| 2008/0270223 A1 | 10/2008 | Collins et al. |
| 2008/0270251 A1* | 10/2008 | Coelho ................. G06Q 20/10 705/14.27 |
| 2008/0276270 A1 | 11/2008 | Kotaru et al. |
| 2008/0281710 A1 | 11/2008 | Hoal |
| 2008/0294624 A1 | 11/2008 | Kanigsberg et al. |
| 2008/0300979 A1 | 12/2008 | Abhyanker |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1 | 1/2009 | Fusillo et al. |
| 2009/0018916 A1 | 1/2009 | Seven et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0030779 A1 | 1/2009 | Tollinger et al. |
| 2009/0037264 A1 | 2/2009 | Del Favero et al. |
| 2009/0055292 A1 | 2/2009 | Chong et al. |
| 2009/0063268 A1 | 3/2009 | Burgess et al. |
| 2009/0063351 A1 | 3/2009 | Schmeyer et al. |
| 2009/0076912 A1 | 3/2009 | Rajan et al. |
| 2009/0094048 A1 | 4/2009 | Wallace et al. |
| 2009/0132347 A1 | 5/2009 | Anderson et al. |
| 2009/0140799 A1 | 6/2009 | Kasperkovitz |
| 2009/0150272 A1 | 6/2009 | Blythe |
| 2009/0156310 A1 | 6/2009 | Fargo |
| 2009/0163227 A1 | 6/2009 | Collins |
| 2009/0164314 A1 | 6/2009 | Blythe |
| 2009/0171842 A1 | 7/2009 | Blythe |
| 2009/0171853 A1 | 7/2009 | Georgiou et al. |
| 2009/0182718 A1 | 7/2009 | Waclawik et al. |
| 2009/0210261 A1 | 8/2009 | Mortimore, Jr. et al. |
| 2009/0228365 A1 | 9/2009 | Tomchek et al. |
| 2009/0247193 A1 | 10/2009 | Kalavade |
| 2009/0247282 A1 | 10/2009 | Cheng |
| 2009/0248457 A1 | 10/2009 | Munter et al. |
| 2009/0248543 A1* | 10/2009 | Nihalani ................. G06Q 30/02 705/26.1 |
| 2009/0259499 A1 | 10/2009 | Bhojwani et al. |
| 2009/0265236 A1 | 10/2009 | Schultz et al. |
| 2009/0271263 A1 | 10/2009 | Regmi et al. |
| 2009/0276306 A1 | 11/2009 | Hicks |
| 2009/0287562 A1 | 11/2009 | Bosch et al. |
| 2009/0288012 A1 | 11/2009 | Hertel et al. |
| 2009/0288140 A1 | 11/2009 | Huber |
| 2009/0289111 A1 | 11/2009 | Motycka et al. |
| 2009/0313109 A1* | 12/2009 | Bous ..................... G06Q 30/02 705/14.31 |
| 2009/0319353 A1 | 12/2009 | Palmeri |
| 2009/0327062 A1 | 12/2009 | Botes |
| 2009/0327174 A1 | 12/2009 | Honkala |
| 2010/0002722 A1 | 1/2010 | Porat |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0088174 A1 | 4/2010 | Cohagan et al. |
| 2010/0094697 A1 | 4/2010 | Cavanaugh |
| 2010/0094698 A1 | 4/2010 | Cawley |
| 2010/0094699 A1 | 4/2010 | Beal |
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1 | 5/2010 | Alderfer |
| 2010/0114686 A1 | 5/2010 | Carlson et al. |
| 2010/0131840 A1 | 5/2010 | Walker et al. |
| 2010/0138299 A1 | 6/2010 | Preston et al. |
| 2010/0145744 A1 | 6/2010 | Beck et al. |
| 2010/0145762 A1 | 6/2010 | Coladonato et al. |
| 2010/0145778 A1 | 6/2010 | Fordyce et al. |
| 2010/0145786 A1 | 6/2010 | Fordyce, III et al. |
| 2010/0145860 A1 | 6/2010 | Pelegero |
| 2010/0153194 A1 | 6/2010 | Oram |
| 2010/0179879 A1 | 7/2010 | Cunningham et al. |
| 2010/0191572 A1 | 7/2010 | Newman et al. |
| 2010/0211419 A1 | 8/2010 | Nickolayev et al. |
| 2010/0228613 A1 | 9/2010 | Anderson et al. |
| 2010/0241502 A1 | 9/2010 | Walker et al. |
| 2010/0241559 A1* | 9/2010 | O'Connor ............... G06Q 10/10 705/39 |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0262456 A1 | 10/2010 | Feng et al. |
| 2010/0312629 A1 | 12/2010 | Wolf et al. |
| 2010/0324990 A1* | 12/2010 | D'Angelo ............... G06Q 10/10 705/14.46 |
| 2010/0332307 A1 | 12/2010 | Parento |
| 2011/0004497 A1 | 1/2011 | Mortimore, Jr. et al. |
| 2011/0022448 A1 | 1/2011 | Strock et al. |
| 2011/0022455 A1 | 1/2011 | Wolf et al. |
| 2011/0029363 A1 | 2/2011 | Gillenson et al. |
| 2011/0029364 A1* | 2/2011 | Roeding ................. G06Q 30/00 705/14.16 |
| 2011/0029367 A1 | 2/2011 | Olson et al. |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1 | 3/2011 | Rodin |
| 2011/0078030 A1 | 3/2011 | Borst et al. |
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125561 A1 | 5/2011 | Marcus |
| 2011/0125565 A1 | 5/2011 | MacIlwaine et al. |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161149 A1 | 6/2011 | Kaplan |
| 2011/0161154 A1 | 6/2011 | McLaughlin et al. |
| 2011/0178928 A1 | 7/2011 | Carmichael et al. |
| 2011/0184792 A1 | 7/2011 | Butcher et al. |
| 2011/0191150 A1 | 8/2011 | Blackhurst et al. |
| 2011/0213670 A1 | 9/2011 | Strutton |
| 2011/0218031 A1 | 9/2011 | Bryant et al. |
| 2011/0225033 A1 | 9/2011 | Schmeyer et al. |
| 2011/0231224 A1 | 9/2011 | Winters |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0264490 A1 | 10/2011 | Durvasula et al. |
| 2011/0270617 A1* | 11/2011 | Pacheco E Murta .. G06Q 30/02 705/1.1 |
| 2011/0270666 A1 | 11/2011 | Welsh et al. |
| 2011/0276373 A1 | 11/2011 | Juszczak et al. |

(56) References Cited

U.S. PATENT DOCUMENTS

| | | |
|---|---|---|
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295689 A1 | 12/2011 | Brady |
| 2011/0295749 A1* | 12/2011 | Scalisi .................. G06Q 20/10 |
| | | 705/44 |
| 2011/0302011 A1 | 12/2011 | Yoder et al. |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029996 A1 | 2/2012 | Lang et al. |
| 2012/0030048 A1* | 2/2012 | Manley .................. G06Q 30/06 |
| | | 705/26.1 |
| 2012/0035997 A1 | 2/2012 | Burgess et al. |
| 2012/0036079 A1 | 2/2012 | Sushil et al. |
| 2012/0036178 A1 | 2/2012 | Gavini et al. |
| 2012/0046958 A1* | 2/2012 | Pynadath .............. G06Q 20/12 |
| | | 705/1.1 |
| 2012/0047008 A1 | 2/2012 | Alhadeff et al. |
| 2012/0053987 A1 | 3/2012 | Satyavolu et al. |
| 2012/0059701 A1 | 3/2012 | Van der Veen et al. |
| 2012/0066037 A1 | 3/2012 | Glen |
| 2012/0066046 A1 | 3/2012 | Satyavolu et al. |
| 2012/0066050 A1 | 3/2012 | Satyavolu et al. |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0101881 A1 | 4/2012 | Taylor et al. |
| 2012/0109751 A1 | 5/2012 | Binenstock et al. |
| 2012/0150740 A1* | 6/2012 | Isaacson .............. G06Q 10/101 |
| | | 705/41 |
| 2012/0196568 A1 | 8/2012 | Bakshi |
| 2012/0197707 A1 | 8/2012 | Cohagan |
| 2012/0203604 A1 | 8/2012 | Baker et al. |
| 2012/0203846 A1 | 8/2012 | Hull et al. |
| 2012/0209672 A1* | 8/2012 | Winner .................. G06Q 30/02 |
| | | 705/14.13 |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221437 A1 | 8/2012 | Yoo |
| 2012/0221479 A1 | 8/2012 | Schneck et al. |
| 2012/0226530 A1 | 9/2012 | Gebb et al. |
| 2012/0239417 A1 | 9/2012 | Pourfallah |
| 2012/0239479 A1 | 9/2012 | Amaro et al. |
| 2012/0253852 A1 | 10/2012 | Pourfallah |
| 2012/0253957 A1 | 10/2012 | Bakshi |
| 2012/0278127 A1 | 11/2012 | Kirakosyan et al. |
| 2012/0296724 A1 | 11/2012 | Faro et al. |
| 2012/0303425 A1 | 11/2012 | Katzin et al. |
| 2012/0303430 A1 | 11/2012 | Tiku et al. |
| 2013/0013396 A1 | 1/2013 | Vinson et al. |
| 2013/0024256 A1 | 1/2013 | Wolf et al. |
| 2013/0040654 A1 | 2/2013 | Parish |
| 2013/0041902 A1 | 2/2013 | Swann et al. |
| 2013/0060623 A1 | 3/2013 | Walker et al. |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1* | 3/2013 | Federov ............ G06F 17/30867 |
| | | 707/749 |
| 2013/0091000 A1 | 4/2013 | Hagey et al. |
| 2013/0103472 A1 | 4/2013 | Burgess et al. |
| 2013/0110555 A1 | 5/2013 | Dunham |
| 2013/0110604 A1 | 5/2013 | Rooke et al. |
| 2013/0124283 A1 | 5/2013 | Kaulbach |
| 2013/0132175 A1 | 5/2013 | Claessen et al. |
| 2013/0132183 A1 | 5/2013 | Klein et al. |
| 2013/0145016 A1 | 6/2013 | Vantalon |
| 2013/0151602 A1 | 6/2013 | McClelland et al. |
| 2013/0173320 A1 | 7/2013 | Bank et al. |
| 2013/0173478 A1 | 7/2013 | Farhi |
| 2013/0178280 A1 | 7/2013 | Ganz |
| 2013/0179246 A1 | 7/2013 | Ross et al. |
| 2013/0191195 A1 | 7/2013 | Carlson et al. |
| 2013/0212177 A1 | 8/2013 | Friedman |
| 2013/0218653 A1* | 8/2013 | Rooke .................. G06Q 20/20 |
| | | 705/14.17 |
| 2013/0238412 A1 | 9/2013 | Boncyk et al. |
| 2013/0246146 A1 | 9/2013 | Fischer et al. |
| 2013/0246185 A1 | 9/2013 | Hardman et al. |
| 2013/0260727 A1 | 10/2013 | Knudson et al. |
| 2013/0262209 A1 | 10/2013 | Boyer |
| 2013/0268333 A1 | 10/2013 | Ovick et al. |
| 2013/0275192 A1 | 10/2013 | Aissa |
| 2013/0304563 A1 | 11/2013 | Haupt et al. |
| 2013/0325946 A1* | 12/2013 | Allison, Jr. ............ G06Q 50/01 |
| | | 709/204 |
| 2013/0346170 A1 | 12/2013 | Epstein et al. |
| 2014/0006129 A1 | 1/2014 | Heath |
| 2014/0006132 A1 | 1/2014 | Barker |
| 2014/0025451 A1 | 1/2014 | Knowles et al. |
| 2014/0025452 A1 | 1/2014 | Knowles et al. |
| 2014/0025453 A1 | 1/2014 | Knowles et al. |
| 2014/0025460 A1 | 1/2014 | Knowles et al. |
| 2014/0046675 A1 | 2/2014 | Harwood |
| 2014/0046744 A1 | 2/2014 | Hagey |
| 2014/0046748 A1* | 2/2014 | Nagarajan .............. G06Q 30/02 |
| | | 705/14.35 |
| 2014/0108108 A1 | 4/2014 | Artman et al. |
| 2014/0164199 A1 | 6/2014 | Wilkes |
| 2015/0039393 A1 | 2/2015 | Jain |
| 2015/0170256 A1 | 6/2015 | Pettyjohn |
| 2015/0248702 A1 | 9/2015 | Chatterton |

FOREIGN PATENT DOCUMENTS

| | | |
|---|---|---|
| WO | 2012106114 | 8/2012 |
| WO | 2012170088 | 12/2012 |
| WO | 2013015846 | 1/2013 |
| WO | 2014106207 | 7/2014 |
| WO | 2015102889 | 7/2015 |
| WO | 2015134947 | 9/2015 |

OTHER PUBLICATIONS

International Preliminary Report on Patentability dated on May 23, 2013 in Application No. PCT/US2012/027810.
USPTO; Advisory Action dated Jun. 6, 2013 in U.S. Appl. No. 13/466,445.
International Preliminary Report on Patentability dated on Jun. 28, 2013 in Application No. PCT/US2012/027664.
International Preliminary Report on Patentability dated on May 7, 2013 in Application No. PCT/US2012/021648.

(56) References Cited

OTHER PUBLICATIONS

USPTO; Advisory Action dated May 9, 2013 in U.S. Appl. No. 13/477,806.
USPTO; Advisory Action dated May 22, 2013 in U.S. Appl. No. 13/188,693.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Final Office Action dated Mar. 6, 2013 in U.S. Appl. No. 13/188,693.
USPTO; Final Office Action dated Jan. 10, 2013 in U.S. Appl. No. 13/468,931.
USPTO; Final Office Action dated Jan. 31, 2013 in U.S. Appl. No. 13/411,281.
USPTO; Final Office Action dated Jan. 31, 2013 in U.S. Appl. No. 13/467,910.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Office Action dated May 2, 2013 in U.S. Appl. No. 13/468,880.
USPTO; Final Office Action dated Apr. 11, 2011 in U.S. Appl. No. 12/857,389.
USPTO; Final Office Action dated Apr. 5, 2011 in U.S. Appl. No. 12/857,424.
Todorova, Aleksandra, "The Best Rewards Programs," www.smartmoney.com, Sep. 2005, pp. 1-2.
Todorova, Aleksandra, "Capital One Tests a New Type of Debit Card," www.smartmoney.com, Jun. 2007, pp. 1-2.
Nickel, "Citi Thank You Redemptions: No Thanks," www.fivecentnickel.com, Sep. 2005.
www.americanexpress.com/gift Feb. 25, 2005, 2 pages.
USPTO; Office Action dated Nov. 26, 2010 in U.S. Appl. No. 12/857,424.
USPTO; Office Action dated Nov. 26, 2010 in U.S. Appl. No. 12/857,389.
USPTO; Office Action dated Apr. 30, 2010 in U.S. Appl. No. 11/779,734.
USPTO; Advisory Action dated Jan. 6, 2011 in U.S. Appl. No. 11/779,734.
USPTO; Final Office Action dated Oct. 15, 2010 in U.S. Appl. No. 11/779,734.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 27, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
PCT; International Search Report and Written Opinion dated May 8, 2012 in Application No. PCT/US2012/021648.
PCT; International Search Report and Written Opinion dated Jun. 19, 2012 in Application No. PCT/US2012/027810.
PCT; International Search Report and Written Opinion dated Jul. 6, 2012 in Application No. PCT/US2012/027664.
USPTO; Office Action dated Aug. 3, 2012 in U.S. Appl. No. 13/466,412.
USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 14, 2012 in U.S. Appl. No. 13/476,910.
USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blue's $1 Million Twitter Hashtag," Aug. 18, 2010, 4 pages, retrieved from: http://danoshinsky.com/2010/08/18/a-social-media-case-study-jetblue-vs-sun-country/.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
MG Seigler, "Want Everyone to See your Credit Card Transactions? Of Course you do. Meet Blippy.", techcrunch.com, Dec. 11, 2009, 3 pages.
Tsotsis, Alexia, "The End of Blippy as We Know it." techcrunch.com, May 19, 2011, 3 pages.
USPTO; Office Action dated Jan. 4, 2013 in U.S. Appl. No. 13/593,204.
USPTO; Office Action dated Jan. 7, 2013 in U.S. Appl. No. 13/467,503.
USPTO; Office Action dated Jan. 7, 2013 in U.S. Appl. No. 13/466,445.
USPTO; Advisory Action dated Mar. 15, 2013 in U.S. Appl. No. 13/593,204.
USPTO; Advisory Action dated Mar. 18, 2013 in U.S. Appl. No. 13/467,503.
USPTO; Advisory Action dated Mar. 19, 2013 in U.S. Appl. No. 13/021,237.
USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Office Action dated Apr. 12, 2013 in U.S. Appl. No. 13/467,910.
USPTO; Restriction Requirement dated Oct. 30, 2013 in U.S. Appl. No. 13/889,288.
USPTO; Advisory Action dated Oct. 4, 2013 in U.S. Appl. No. 13/468,880.
USPTO; Advisory Action dated Oct. 7, 2013 in U.S. Appl. No. 12/857,424.

(56) References Cited

OTHER PUBLICATIONS

USPTO; Final Office Action dated Oct. 30, 2013 in U.S. Appl. No. 11/779,734.
USPTO; Office Action dated Nov. 6, 2013 in U.S. Appl. No. 13/889,272.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.
USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Advisory Action dated Apr. 30, 2014 in U.S. Appl. No. 13/715,423.
USPTO; Final Office Action dated May 5, 2014 in U.S. Appl. No. 13/411,281.
International Search Report and Written Opinion dated Dec. 7, 2012 in Application No. PCT/2012/056231.
International Preliminary Report on Patentability dated on Aug. 22, 2013 in Application No. PCT/US2012/056231.
USPTO; Office Action dated Oct. 11, 2013 in U.S. Appl. No. 13/245,636.
USPTO; Office Action dated Feb. 5, 2014 in U.S. Appl. No. 13/245,636.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 13/889,285.
USPTO; Office Action dated Jan. 15, 2014 in U.S. Appl. No. 13/411,281.
USPTO; Office Action dated Jan. 30, 2014 in U.S. Appl. No. 13/476,910.
USPTO; Office Action dated Feb. 3, 2014 in U.S. Appl. No. 13/593,204.
International Preliminary Report on Patentability dated on Feb. 3, 2014 in Application No. PCT/US2013/028209.
USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.
Golson, "Major League Baseball Rolling out Thousands of iBeacons for Opening Day," Jan. 30, 2014, pp. 2-3, retrieved from http://www.macrumors.com/2014/01/30/mlb-ibeacon-rollout/ on Feb. 12, 2014.
D Arthur, S Vassilvitskii, "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
K-means++ Wikipedia Page, pp. 1-4, page last modified on Nov. 18, 2013, http://en.wikipedia.org/wiki/K-means++ retrieved from the web Nov. 21, 2013.
Examination Report dated Aug. 11, 2014 in New Zealand Application No. 623019.
USPTO; Advisory Action dated Sep. 3, 2014 in U.S. Appl. No. 13/466,412.
USPTO; Office Action dated Oct. 17, 2014 in U.S. Appl. No. 14/065,883.
USPTO; Office Action dated Jul. 30, 2014 in U.S. Appl. No. 13/794,301.
USPTO; Advisory Action dated Sep. 3, 2014 in U.S. Appl. No. 13/467,503.
USPTO; Advisory Action dated Jul. 30, 2014 in U.S. Appl. No. 13/411,281.
USPTO; Advisory Action dated Sep. 5, 2014 in U.S. Appl. No. 13/889,305.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 3, 2014 in U.S. Appl. No. 13/021,237.
USPTO; Office Action dated Oct. 17, 2014 in U.S. Appl. No. 11/779,734.
USPTO; Advisory Action dated Sep. 3, 2014 in U.S. Appl. No. 12/857,389.
USPTO; Advisory Action dated Jul. 30, 2014 in U.S. Appl. No. 13/593,204.
USPTO; Office Action dated Oct. 20, 2014 in U.S. Appl. No. 13/941,306.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 3, 2014 in U.S. Appl. No. 12/857,424.
USPTO; Advisory Action dated Sep. 2, 2014 in U.S. Appl. No. 13/466,445.
USPTO; Office Action dated Oct. 9, 2014 in U.S. Appl. No. 13/926,789.
USPTO; Advisory Action dated Jul. 31, 2014 in U.S. Appl. No. 13/476,910.
USPTO; Advisory Action dated Aug. 7, 2014 in U.S. Appl. No. 13/468,931.
USPTO; Office Action dated Oct. 8, 2014 in U.S. Appl. No. 13/734,693.
USPTO; Office Action dated Jun. 24, 2014 in U.S. Appl. No. 13/468,880.
USPTO; Final Office Action dated May 13, 2014 in U.S. Appl. No. 13/476,910.
USPTO; Final Office Action dated May 20, 2014 in U.S. Appl. No. 13/593,204.
USPTO; Notice of Allowance dated May 22, 2014 in U.S. Appl. No. 13/245,636.
USPTO; Final Office Action dated May 29, 2014 in U.S. Appl. No. 13/468,931.
USPTO; Advisory Action dated Jun. 2, 2014 in U.S. Appl. No. 13/889,272.

(56) References Cited

OTHER PUBLICATIONS

USPTO; Advisory Action dated Jul. 8, 2014 in U.S. Appl. No. 13/889,299.
USPTO; Office Action dated Jun. 5, 2014 in U.S. Appl. No. 11/779,734.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 11, 2014 in U.S. Appl. No. 13/188,693.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated May 7, 2014 in U.S. Appl. No. 13/477,806.
USPTO; Final Office Action dated Feb. 11, 2015 in U.S. Appl. No. 14/065,883.
USPTO; Final Office Action dated Jan. 30, 2015 in U.S. Appl. No. 13/794,301.
Search Report and Written Opinion dated Feb. 16, 2015 in Singapore Application No. 11201400788P.
USPTO; Final Office Action dated Feb. 13, 2015 in U.S. Appl. No. 13/794,334.
USPTO; Final Office Action dated Feb. 26, 2015 in U.S. Appl. No. 13/941,306.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Final Office Action dated Mar. 23, 2015 in U.S. Appl. No. 13/926,789.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.
USPTO; Office Action dated Oct. 29, 2014 in U.S. Appl. No. 13/926,895.
USPTO; Office Action dated Nov. 7, 2014 in U.S. Appl. No. 13/715,792.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Office Action dated Jan. 16, 2015 in U.S. Appl. No. 13/889,299.
USPTO; Advisory Action dated Nov. 17, 2015 in U.S. Appl. No. 13/468,880.
USPTO; Advisory Action dated Sep. 29, 2015 in U.S. Appl. No. 13/686,608.
USPTO; Notice of Allowance dated Sep. 29, 2015 in U.S. Appl. No. 13/715,792.
USPTO; Office Action dated Oct. 8, 2015 in U.S. Appl. No. 13/941,306.
USPTO; Advisory Action dated Oct. 13, 2015 in U.S. Appl. No. 13/021,237.
USPTO; Advisory Action dated Oct. 16, 2015 in U.S. Appl. No. 13/466,445.
USPTO; Final Office Action dated Oct. 16, 2015 in U.S. Appl. No. 13/443,100.
USPTO; Advisory Action dated Oct. 22, 2015 in U.S. Appl. No. 13/188,693.
USPTO; Final Office Action dated Oct. 26, 2015 in U.S. Appl. No. 13/476,910.
USPTO; Final Office Action dated Oct. 26, 2015 in U.S. Appl. No. 13/467,503.
USPTO; Advisory Action dated Nov. 17, 2015 in U.S. Appl. No. 13/889,299.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Aug. 17, 2015 in U.S. Appl. No. 13/439,768.
USPTO; Advisory Action dated Jun. 25, 2015 in U.S. Appl. No. 13/734,693.
USPTO; Advisory Action dated Jun. 26, 2015 in U.S. Appl. No. 13/794,145.
USPTO; Advisory Action dated Jun. 29, 2015 in U.S. Appl. No. 13/715,792.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.
USPTO; Final Office Action dated Jul. 17, 2015 in U.S. Appl. No. 13/188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 5, 2015 in U.S. Appl. No. 13/926,789.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 28, 2015 in U.S. Appl. No. 13/794,272.
USPTO; Office Action dated Aug. 19, 2015 in U.S. Appl. No. 13/926,884.
Examination Report dated Mar. 24, 2015 in Australian Application No. 2012316453.
USPTO; Final Office Action dated Mar. 25, 2015 in U.S. Appl. No. 13/477,806.
USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.

(56) References Cited

OTHER PUBLICATIONS

USPTO; Advisory Action dated Apr. 8, 2015 in U.S. Appl. No. 13/794,301.
USPTO; Office Action dated Apr. 8, 2015 in U.S. Appl. No. 13/021,237.
USPTO; Final Office Action dated Apr. 8, 2015 in U.S. Appl. No. 13/794,145.
USPTO; Final Office Action dated Apr. 13, 2015 in U.S. Appl. No. 13/734,693.
Lee et al., "iJADE eMiner—A Web Based Mining Agent Based on Intelligent Java Agent Development Environment (iJADE) on Internet Shopping," Advances in Knowledge Discovery and Data Mining, 2001, Springer-Verlag, pp. 28-40.
USPTO; Final Office Action dated Apr. 17, 2015 in U.S. Appl. No. 13/715,792.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Notice of Acceptance dated May 8, 2015 in New Zealand Application No. 623019.
USPTO; Advisory Action dated May 8, 2015 in U.S. Appl. No. 13/941,306.
USPTO; Final Office Action dated May 13, 2015 in U.S. Appl. No. 11/779,734.
USPTO; Office Action dated May 19, 2015 in U.S. Appl. No. 13/476,910.
USPTO; Office Action dated May 28, 2015 in U.S. Appl. No. 13/467,503.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Advisory Action dated Jun. 10, 2015 in U.S. Appl. No. 13/477,806.
USPTO; Advisory Action dated Jun. 11, 2015 in U.S. Appl. No. 13/926,789.
Burke, "Hybrid Recommender Systems: Survey and Experiments," User modeling and user-adapted interaction, 2002, Kluwer Academic Publishers, pp. 331-370.
Aimeur et al., "Alambic: a privacy-preserving recommender system for electronic commerce," Feb. 27, 2008, Springer-Verlag, pp. 307-334.
Tang, "Approac to detection of community's consensus and interest," Institute of Systems Science, 2008, Springer-Verlag, pp. 17-29.
USPTO; Office Action dated Dec. 4, 2015 in U.S. Appl. No. 13/794,145.
USPTO; Office Action dated Dec. 17, 2015 in U.S. Appl. No. 13/715,770.
USPTO; Office Action dated Dec. 31, 2015 in U.S. Appl. No. 13/734,693.
USPTO; Final Office Action dated Dec. 30, 2015 in U.S Appl. No. 14/065,883.
USPTO; Advisory Action dated Jan. 6, 2016 in U.S. Appl. No. 13/443,100.
USPTO; Final Office Action dated Jan. 11, 2016 in U.S. Appl. No. 13/411,281.
USPTO; Advisory Action dated Jan. 11, 2016 in U.S. Appl. No. 13/467,503.
Park, et al., "Location-Based Recommendation System using Bayesian User's Preference Model in Mobile Devices," Ubiquitous Intelligence and Computing, 2007, Springer-Verlag Berlin Heidelberg, 10 pages.
USPTO; Final Office Action dated Jan. 14, 2016 in U.S. Appl. No. 13/794,301.
USPTO; Office Action dated Jan. 15, 2016 in U.S. Appl. No. 13/889,299.
USPTO; Advisory Action dated Jan. 15, 2016 in U.S. Appl. No. 13/476,910.
USPTO; Office Action dated Jan. 14, 2016 in U.S. Appl. No. 13/889,272.
Pashtan, et al., "Personal Service Areas for Mobile Web Applications," IEEE Internet Computing, 2004, ieeexplore.ieee.org, 7 pages.
Pandey, et al., "Exploiting User Profiles to Support Differentiated Services in Next-Generation Wireless Networks," Network, IEEE, 2004, ieeexplore.ieee.org, 23 pages.
Liapis, et al., Implementing a Low-Cost, Personalized and Location Based Service for Delivering Advertisements to Mobile Users, Athens Information Technology, Oct. 2008, ieeexplore.ieee.org, 49 pages.
USPTO; Office Action dated Feb. 1, 2016 in U.S. Appl. No. 13/443,100.
USPTO; Final Office Action dated Feb. 2, 2016 in U.S. Appl. No. 13/926,789.
USPTO; Final Office Action dated Feb. 2, 2016 in U.S. Appl. No. 13/941,306.
USPTO; Final Office Action dated Feb. 9, 2016 in U.S. Appl. No. 13/794,374.
USPTO; Final Office Action dated Feb. 9, 2016 in U.S. Appl. No. 13/794,272.
USPTO; Final Office Action dated Feb. 11, 2016 in U.S. Appl. No. 13/794,334.
USPTO; Final Office Action dated Feb. 11, 2016 in U.S Appl. No. 13/926,884.
USPTO; Final Office Action dated Feb. 12, 2016 in U.S Appl. No. 13/926,895.
USPTO; Office Action dated Feb. 12, 2016 in U.S. Appl. No. 13/593,204.
USPTO; Office Action dated Feb. 19, 2016 in U.S. Appl. No. 13/468,931.
Office Action dated Feb. 29, 2016 in Canadian Application No. 2,874,582.
USPTO; Office Action dated Feb. 29, 2016 in U.S. Appl. No. 13/686,608.
USPTO; Office Action dated Mar. 4, 2016 in U.S. Appl. No. 13/466,412.
USPTO; Office Action dated Mar. 4, 2016 in U.S. Appl. No. 13/794,226.
USPTO; Office Action dated Mar. 7, 2016 in U.S. Appl. No. 12/857,389.
USPTO; Office Action dated Mar. 17, 2016 in U.S. Appl. No. 13/889,305.
USPTO; Advisory Action dated Mar. 18, 2016 in U.S. Appl. No. 13/439,768.
USPTO; Advisory Action dated Mar. 18, 2016 in U.S. Appl. No. 13/411,281.
USPTO; Advisory Action dated Mar. 25, 2016 in U.S. Appl. No. 13/794,301.
USPTO; Advisory Action dated Mar. 28, 2016 in U.S. Appl. No. 14/065,883.
White, "Deals as Debit Rewards? Bank of America Brings Back Debit Card Rewards With a Twist," Jan. 25, 2012, 2 pages, retrieved from http://moneyland.time.com/2012/01/25/deals-as-debit-rewards-bank-of-america-brings-back-debit-card-rewards-with-a-twist/.
Owen, et al., "Improving the Value and Performance of Online Offers," A First Data White Paper, First Data Corporation, 2012, 10 pages.
Noyes, "Card-Linked Offers Update," Transaction World Magazine, Jul. 2012, 2 pages.
Written Opinion dated Aug. 5, 2015 in Singapore Application No. 11201400788P.
Examination Report dated Feb. 26, 2016 in Australian Application No. 2015201925.
USPTO; Office Action dated Mar. 31, 2016 in U.S. Appl. No. 13/889,288.
USPTO; Final Office Action dated Apr. 14, 2016 in U.S. Appl. No. 13/715,770.

(56) References Cited

OTHER PUBLICATIONS

USPTO; Office Action dated Apr. 15, 2016 in U.S. Appl. No. 13/188,693.
USPTO; Advisory Action dated Apr. 15, 2016 in U.S. Appl. No. 13/926,789.
USPTO; Notice of Allowance dated Apr. 18, 2016 in U.S. Appl. No. 13/734,693.
USPTO; Advisory Action dated Apr. 21, 2016 in U.S. Appl. No. 13/794,272.
USPTO; Advisory Action dated Apr. 22, 2016 in U.S. Appl. No. 13/794,374.
Office Action dated Apr. 25, 2016 in Canadian Application No. 2,888,085.
USPTO; Advisory Action dated May 2, 2016 in U.S. Appl. No. 13/926,884.
USPTO; Advisory Action dated May 2, 2016 in U.S. Appl. No. 13/794,334.
USPTO; Office Action dated May 16, 2016 in U.S. Appl. No. 13/153,890.
USPTO; Office Action dated May 26, 2016 in U.S. Appl. No. 13/477,806.
USPTO; Office Action dated May 19, 2016 in U.S. Appl. No. 13/926,895.
USPTO; Notice of Allowance dated May 25, 2016 in U.S. Appl. No. 13/439,768.
Pang, et al., "Opinion mining and sentiment analysis", Foundations and trends in information retrieval, vol. 2, No. 1-2 (2008) 1-135.
Pavlovic, "Dynamics, robustness and fragility of trust", Formal Aspects in Secruity and Trust, 2009—Springer.
Resnick, et al., "Recommender Systems", Mar. 1997, Communications of the ACM, vol. 40,No. 3, pp. 56-58.
Ricci, et al.; "Recommendation and Personalization in eCommerce", Proceedings of the AH'2002 Workshop on Recommendation and Personalization in eCommerce, Malaga, Spain, May 28, 2002, pp. 1-160.
Ghose, et al., "Opinion Mining using Econometrics: A case study on Reputation Systems", Department of Information, Operations, and Management Sciences, Annual Meeting, 2007.
Office Action dated Oct. 26, 2015 in Canadian Application No. 2,863,576.
Notice of Acceptance dated Nov. 30, 2015 in Australian Application No. 2012316453.
Office Action dated Dec. 10, 2015 in Canadian Application No. 2,849,271.
USPTO; Office Action dated Jun. 3, 2016 in U.S. Appl. No. 14/065,883.
USPTO; Office Action dated Jun. 3, 2016 in U.S. Appl. No. 12/857,424.
USPTO; Notice of Allowance dated Jun. 3, 2016 in U.S. Appl. No. 13/593,204.
USPTO; Final Office Action dated Jun. 8, 2016 in U.S. Appl. No. 12/857,389.
USPTO; Office Action dated Jun. 9, 2016 in U.S. Appl. No. 13/926,895.
USPTO; Final Office Action dated Jun. 10, 2016 in U.S. Appl. No. 13/466,412.
USPTO; Final Office Action dated Jun. 13, 2016 in U.S. Appl. No. 13/468,931.
USPTO; Final Office Action dated Jun. 15, 2016 in U.S. Appl. No. 13/686,608.
USPTO; Office Action dated Jun. 17, 2016 in U.S. Appl. No. 13/468,880.
USPTO; Office Action dated Jun. 17, 2016 in U.S. Appl. No. 13/941,306.
USPTO; Final Office Action dated Jun. 17, 2016 in U.S. Appl. No. 13/794,145.
USPTO; Advisory Action dated Jun. 24, 2016 in U.S. Appl. No. 13/715,770.
USPTO; Final Office Action dated Jul. 1, 2016 in U.S. Appl. No. 131794,226.
USPTO; Final Office Action dated Jul. 5, 2016 in U.S. Appl. No. 13/889,305.
USPTO; Advisory Action dated Jul. 6, 2016 in U.S. Appl. No. 13/468,931.
USPTO; Office Action dated Jul. 7, 2016 in U.S. Appl. No. 14/284,817.
USPTO; Notice of Allowance dated Jul. 13, 2016 in U.S. Appl. No. 11/779,734.
USPTO; Final Office Action dated Jul. 28, 2016 in U.S. Appl. No. 13/889,272.
USPTO; Final Office Action dated Aug. 12, 2016in U.S. Appl. No. 13/889,299.
"What is a token in programming?" Quora, pp. 1-3, retrieved from https://www.quora.com/What-is-a-token-in-programming on May 31, 2016.
EP Australia; Examination Report dated Aug. 3, 2016 in Australian Application No. 2015201925.
USPTO; Advisory Action dated Aug. 17, 2016 in U.S. Appl. No. 12/857,389.
CIPO; Notice of Allowance dated Aug. 18, 2016 in Canadian Application No. 2,863,576.
USPTO; Advisory Action dated Aug. 18, 2016 in U.S. Appl. No. 13/466,412.
USPTO; Notice of Allowance dated Aug. 24, 2016 in U.S. Appl. No. 13/021,237.
USPTO; Advisory Action dated Aug. 24, 2016 in U.S. Appl. No. 13/686,608.
USPTO; Office Action dated Aug. 24, 2016 in U.S. Appl. No. 131794,334.
USPTO; Final Office Action dated Aug. 25, 2016 in U.S. Appl. No. 13/466,445.
USPTO; Advisory Action dated Aug. 25, 2016 in U.S. Appl. No. 13/794,145.
USPTO; Final Office Action dated Aug. 26, 2016 in U.S. Appl. No. 13/443,100.
USPTO; Final Office Action dated Sep. 2, 2016 in U.S. Appl. No. 12/857,424.
USPTO; Office Action dated Sep. 2, 2016 in U.S. Appl. No. 13/467,503.
USPTO; Advisory Action dated Oct. 27, 2016 in U.S. Appl. No. 12/857,424.
USPTO; Final Office Action dated Sep. 7, 2016 in U.S. Appl. No. 13/153,890.
USPTO; Notice of Allowance dated Sep. 9, 2016 in U.S. Appl. No. 13/926,789.
USPTO; Advisory Action dated Sep. 12, 2016 in U.S. Appl. No. 13/889,305.
USPTO; Final Office Action dated Sep. 14, 2016 in U.S. Appl. No. 13/477,806.
USPTO; Advisory Action dated Sep. 21, 2016 in U.S. Appl. No. 13/889,272.
USPTO; Final Office Action dated Sep. 22, 2016 in U.S. Appl. No. 13/889,288.
USPTO; Advisory Action dated Sep. 22, 2016 in U.S. Appl. No. 13/794,226.
USPTO; Final Office Action dated Sep. 23, 2016 in U.S. Appl. No. 14/065,883.
USPTO; Office Action dated Sep. 29, 2016 in U.S. Appl. No. 12/857,389.
USPTO; Office Action dated Sep. 29, 2016 in U.S. Appl. No. 13/466,412.
USPTO; Final Office Action dated Sep. 30, 2016 in U.S. Appl. No. 13/941,306.
USPTO; Office Action dated Oct. 7, 2016 in U.S. Appl. No. 13/715,770.
USPTO; Notice of Allowance dated Oct. 11, 2016 in U.S. Appl. No. 13/926,884.
USPTO; Office Action dated Oct. 11, 2016 in U.S. Appl. No. 13/794,145.
USPTO; Office Action dated Oct. 11, 2016 in U.S. Appl. No. 13/794,226.
USPTO; Office Action dated Oct. 11, 2016 in U.S. Appl. No. 13/794,301.

(56) References Cited

OTHER PUBLICATIONS

Supplementary Examination Report dated Oct. 17, 2016 in New Zealand Application No. 11201400788P.
USPTO; Advisory Action dated Oct. 31, 2016 in U.S. Appl. No. 13/889,288.
USPTO; Advisory Action dated Nov. 1, 2016 in U.S. Appl. No. 13/153,890.
USPTO; Final Office Action dated Nov. 1, 2016 in U.S. Appl. No. 13/926,895.
Notice of Eligibility for Grant dated Nov. 1, 2016 in Singapore Application No. 11201400788P.
USPTO; Notice of Allowance dated Nov. 2, 2016 in U.S. Appl. No. 13/477,806.
USPTO; Advisory Action dated Nov. 3, 2016 in U.S. Appl. No. 14/065,883.
USPTO; Advisory Action dated Nov. 4, 2016 in U.S. Appl. No. 13/443,100.
USPTO; Final Office Action dated Nov. 4, 2016 in U.S. Appl. No. 13/794,334.
USPTO; Office Action dated Nov. 10, 2016 in U.S. Appl. No. 13/476,910.
USPTO; Final Office Action dated Nov. 10, 2016 in U.S. Appl. No. 14/284,817.
USPTO; Advisory Action dated Nov. 15, 2016 in U.S. Appl. No. 13/889,299.
USPTO; Advisory Action dated Nov. 16, 2016 in U.S. Appl. No. 13/941,306.
USPTO; Notice of Allowance dated Nov. 17, 2016 in U.S. Appl. No. 12/857,424.
USPTO; Final Office Action dated Nov. 17, 2016 in U.S. Appl. No. 13/188,693.
USPTO; Notice of Allowance dated Nov. 18, 2016 in U.S. Appl. No. 13/468,931.
USPTO; Office Action dated Nov. 18, 2016 in U.S. Appl. No. 13/443,100.
Examination Report dated Nov. 22, 2016 in Australian Application No. 2015201925.
USPTO; Office Action dated Nov. 28, 2016 in U.S. Appl. No. 14/065,883.
USPTO; Office Action dated Dec. 2, 2016 in U.S. Appl. No. 13/153,890.
USPTO; Office Action dated Dec. 14, 2016 in U.S. Appl. No. 13/941,306.
USPTO; Advisory Action dated Dec. 14, 2016 in U.S. Appl. No. 13/794,334.
USPTO; Final Office Action dated Dec. 15, 2016 in U.S. Appl. No. 13/468,880.
USPTO; Office Action dated Dec. 15, 2016 in U.S. Appl. No. 13/411,281.
USPTO; Office Action dated Dec. 20, 2016 in U.S. Appl. No. 13/889,305.
USPTO; Office Action dated Jan. 4, 2017 in U.S. Appl. No. 13/794,334.
USPTO; Office Action dated Jan. 13, 2017 in U.S. Appl. No. 13/794,374.
USPTO; Advisory Action dated Dec. 8, 2016 in U.S. Appl. No. 13/926,895.
U.S. Appl. No. 15/334,490, filed Oct. 26, 2016 and titled System and Method for Provisioning Items.
U.S. Appl. No. 15/334,554, filed Oct. 26, 2016 and titled Provisioning Available Appointments.

\* cited by examiner

| 900 | DATA MATCHING | Third Party | Spend Verification System |
|---|---|---|---|
| 910 | User Name: | John Smith | John W Smith |
| 920 | DOB: | 06.18.80 | 06/18/1980 |
| 930 | Merchant Name: | ACME Hotel | ACME Hotel NYC |
| 940 | Date of Review/ Transaction: | 01.01.12 | 12/25/2008 |

SYSTEM AND METHOD FOR CREATING RESERVATIONS

CROSS REFERENCE TO RELATED APPLICATIONS

This application claims priority to, and the benefit of, U.S. Provisional Ser. No. 61/701,683, filed Sep. 16, 2012 and entitled "PURCHASING IN A DIGITAL CHANNEL," which is hereby incorporated by reference in its entirety for all purposes. This application further claims priority to, and the benefit of, U.S. Provisional Ser. No. 61/701,685, filed Sep. 16, 2012, which is hereby incorporated by reference in its entirety for all purposes. This application also claims priority to U.S. Provisional Ser. No. 61/701,686, filed Sep. 16, 2012, which is hereby incorporated by reference in its entirety for all purposes. This application also claims priority to U.S. Provisional Ser. No. 61/701,688, filed Sep. 16, 2012, which is hereby incorporated by reference in its entirety for all purposes. This application also claims priority to U.S. Provisional Ser. No. 61/754,354, filed Jan. 18, 2013, which is hereby incorporated by reference in its entirety for all purposes.

FIELD

The present disclosure generally relates to activities in digital channels. More specifically, the present disclosure relates to associating activities in digital channels with one or more transaction accounts to provide rewards, discounts, and/or purchasing opportunities.

BACKGROUND

Traditional purchasing channels limit a consumer's ability to purchase goods and services. These channels require consumers to visit brick and mortar businesses or e-commerce sites. As such, there is a need to provide non-traditional purchasing channels for a consumer to purchase goods and services.

SUMMARY

As e-commerce and digital activities grow and the boundaries of the virtual marketplace and virtual world disappear, consumers are looking for ways to more easily conduct transactions (e.g., purchases or obtaining items from merchants) or take actions associated with transactions (e.g., spend verified activities and/or reviews). As a result, merchants, payment processors, entertainment providers and other similarly situated entities are also looking for new ways to attract consumers. Such entities are looking to provide alternatives to traditional point of sale interfaces that require payment tokens (e.g., credit/charge/debit cards, NFC, fobs, and the like) or virtual payment terminals that require consumers to provide transaction account information to allow users to more easily purchase the items they desire or require. Further, spend verification of activities allows a user to verify activities by confirming that the user's action associated with the activity is associated with an actual transaction for an item.

The systems, methods and computer program products (collectively "systems") described herein allow a digital channel to be augmented or supplemented to become a payment channel. In operation, the system is capable of syncing or associating a consumer's channel profile with a consumers transaction account. The information to sync the profile and the transaction account may be captured in the channel, by the transaction account issuer (e.g., at the transaction account issuer website), or by a third party service. In response to the transaction account and the profile being synced, the system may track consumer activities in the digital channel. If an activity is associated with some criteria (e.g., a transaction initiation), the system may initiate an action associated with the transaction account. The system may, for example, initiate a transaction with a merchant, trigger a digital channel to request a review associated with a recently purchased item or service experience, provide a reward based on an in channel accomplishment, and/or the like.

The systems provide a seamless experience for consumers in various digital channels (e.g., social media channels and entertainment channels) by allowing consumers to initiate purchases, earn rewards and/or provide feedback without leaving a channel to engage a traditional payment channel (e.g., a brick and mortar merchant location, an e-commerce site, and/or the like). In this way, the systems consolidate payment channels and digital channels to provide a platform for social commerce. The systems provide flexibility and efficiency for consumers and merchants by allowing them to connect and transact in any channel. Further, the systems allow channel providers to reward consumers and request feedback. As such, these various systems provide consumers, merchants and channel providers with the flexibility to engage in social commerce in any suitable channel.

In the context of a social media channel (e.g., Twitter), the systems may be configured to allow purchases based on an activity in the social media channel (e.g., a Tweet). In response to a sync between the social media channel and the transaction account, a user may broadcast a predefined indicator (e.g., a hashtag), that triggers the system to initiate a purchase. The synced transaction account may be charged for the initiated purchase and that item associated with the purchase may be provided to the user.

In the context of an entertainment channel (e.g., XBox), the system may be configured to allow purchases and/or rewards. In response to a sync between the entertainment channel and the transaction account, a user may use the entertainment channel (e.g., play a video game). During use, the user may reach a predefined level of accomplishment, take an action, and/or make a selection that triggers the system to provide a reward or initiate a purchase. The reward may be provided in any suitable form to the transaction account (e.g., as a monetary credit or an offer that is loaded to the transaction account) and/or credited to a reward account associated with the user and/or the entertainment channel. The synced transaction account may be charged for the initiated purchase and that item associated with the purchase may be provided to the user.

In the context of a review channel (e.g., Trip Advisor), the system may be configured to verify an existing review or request a review in response to a purchase. In response to a sync between the review channel and the transaction account, the system may compare transactions associated with the transaction account to reviews for items associated with the user. If the system matches a review with a transaction, the system may certify or otherwise verify that the review was associated with an actual transaction. The system may also generate requests for reviews, in response to transactions for items being initiated or completed with the transaction account. In response to the review being submitted, the review system may certify or otherwise verity the review.

In the context of a reservation channel (e.g., Open Table), the system may be capable of creating a reservation for an item. In response to a sync between the reservation channel and the transaction account, the system may create a reservation for an item based on a user request. In response to the item being provided to the user by the merchant, the system may be capable of facilitating payment for the item (e.g., a meal) and updating an inventory associated with merchant (e.g., available tables at a restaurant). A record associated with the transaction may also be provided by the merchant to the user in the channel.

In various embodiments, the systems described herein are generally configured to monitor actions in digital channels. The system may associate a transaction account with a digital channel profile. Based on the association, the system may compare an action associated with the digital channel profile to criteria. If the action satisfies the criteria, the system may initiate a transaction based on the action at least partially satisfying the criteria. The system may then transmit transaction information for an item in response to the satisfying.

In various embodiments, the systems may be configured to receive a broadcast from a broadcast channel. The broadcast and the broadcast channel may be associated with a transaction account. The system may compare the broadcast to criteria. In response to the broadcast at least partially satisfying the criteria, the system may request confirmation information. The system may also transmit transaction instructions for an item in response to receiving the confirmation information.

In various embodiments, the system may receive activity information from an entertainment channel. The system may analyze the activity information based on criteria associated with a transaction. If the activity information satisfies a transaction event, the system may evaluate preferences for a transaction. The system may also initiate a transaction based on the preferences.

In various embodiments, the system may receive channel profile information and action information. The system may determine transaction account information based on the channel profile information. The system may also compare the action information to criteria. The system may transmit verification instructions in response to the profile information being associated with the transaction account information and the action information at least partially satisfying the criteria.

In various embodiments, the system may associate a reservation created in a digital channel based on an action in the channel with a transaction account. The channel profile may be associated with the action that is associated with a transaction account. The system may link the transaction information with the reservation. The transaction information may be provided by the merchant through the channel. The system may also initiate a transaction in response to the use of the reserved item and the transaction information being provided by the merchant.

BRIEF DESCRIPTION OF THE DRAWINGS

The features and advantages of the present disclosure will become more apparent from the detailed description set forth below when taken in conjunction with the drawings.

FIG. 9 shows an overview of a reconciliation table for associating a transaction with a review, in accordance with various embodiments.

FIG. 10 shows an exemplary request for review on an electronic device and the associated review, in accordance with various embodiments.

DETAILED DESCRIPTION

Figure 1:
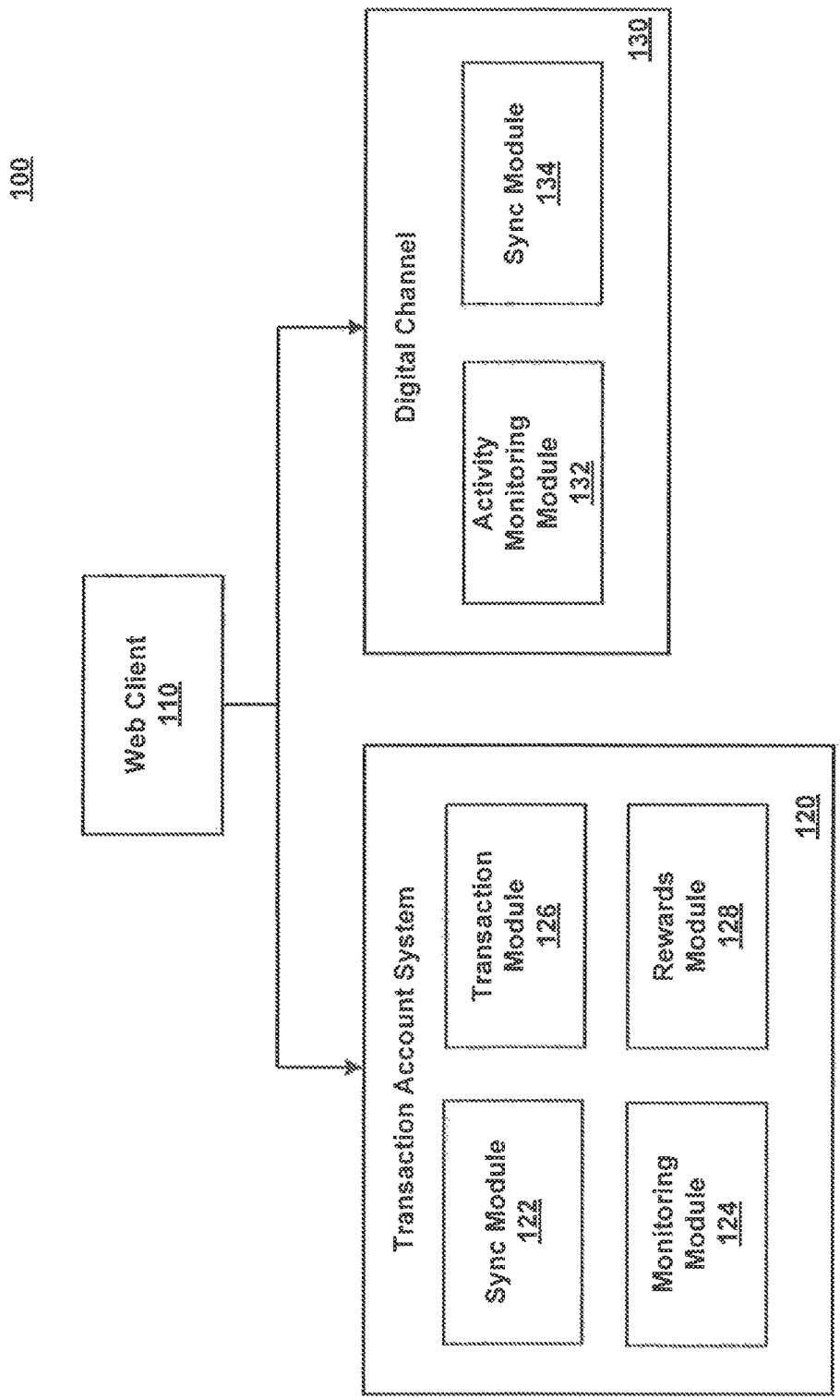
FIG. 1 is a system diagram showing various elements of a digital channel activity monitoring, purchasing, and/or verification system, in accordance with various embodiments.

In various e-embodiments, the systems, methods and computer program products described herein provide a consumer with the ability to take action in digital channels (e.g., purchases, spend verified activities, and/or the like). The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The phrases consumer, customer, user, account holder, account affiliate, cardmember and/or the like shall include any person, entity, business, government organization, business, software, hardware, machine associated with a transaction account, buys merchant offerings offered by one or more merchants using the account and/or is designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Terms and phrases similar to "sync," "syncing," and/or "synchronizing" may include associating, tagging, flagging, correlating, using a look-up table or any other method or system for indicating or creating a relationship between elements such as, for example (i) a transaction account and (ii) an item (e.g., offer, reward, discount) and/or digital channel. Moreover, the sync may occur at any point, in response to any suitable action, event, or period of time. The sync may occur at pre-determined intervals, periodic, randomly, once, more than once, or in response to a suitable request or action.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action.

As e-commerce and digital activities grow and the boundaries of the virtual marketplace and virtual world disappear, consumers are looking for ways to more easily conduct transactions (e.g., purchases or obtaining items from merchants) or take actions associated with transactions (e.g., spend verified activities and/or reviews). As a result, merchants, payment processors, entertainment providers and other similarly situated entities are also looking for new ways to attract consumers. Such entities are looking to provide alternatives to traditional point of sale interfaces that require payment tokens (e.g., credit/charge/debit cards, NFC, fobs, and the like) or virtual payment terminals that require consumers to provide transaction account information to allow users to more easily purchase the items they desire or require. Further, spend verification of activities allows a user to verify activities by confirming that the user's action associated with the activity is associated with an actual transaction for an item.

The systems described herein allow any digital channel to be augmented or supplemented to become a payment channel. In operation, the system is capable of syncing or associating a consumer's channel profile with a consumer's transaction account. The information to sync the profile and the transaction account may be captured in the channel, by the transaction account issuer (e.g., at the transaction account issuer website), or by a third party service. In response to the transaction account and the profile being synced, the system may track consumer activities in the digital channel. If an activity meets some criteria (e.g., a transaction initiation), the system may initiate an action associated with the transaction account. The system may, for example, initiate a transaction with a merchant, trigger a digital channel to request a review associated with a recently purchased item or service experience, provide a reward based on an in channel accomplishment, and/or the like.

The systems provide a seamless experience for consumers in various digital channels (e.g., social media channels and entertainment channels) by allowing consumers to initiate purchases, earn rewards and provide feedback, without leaving a channel to engage a traditional payment channel (e.g., a brick and mortar merchant location, an e-commerce site, and/or the like). In this way, the systems consolidate payment channels and digital channels to provide a platform for social commerce. The systems provide flexibility and efficiency for consumers and merchants by allowing them to connect and transact in any channel. Further, the systems allow channel providers to reward consumers and request feedback. As such, these various systems provide consumers, merchants and channel providers with the flexibility to engage in social commerce in any suitable channel. In the context of a social media channel (e.g., Twitter), the systems may be configured to allow purchases based on an activity in the social media channel (e.g., a Tweet). In response to a sync between the social media channel and the transaction account, a user may broadcast a predefined indicator (e.g., a hashtag), that triggers the system to initiate a purchase. The synced transaction account may be charged for the initiated purchase and that item associated with the purchase may be provided to the user.

In the context of an entertainment channel (e.g., XBox), the system may be configured to allow purchases and/or rewards. In response to a sync between the entertainment channel and the transaction account, a user may use the entertainment channel (e.g., play a video game). During use, the user may reach a predefined level of accomplishment, take an action, and/or make a selection that triggers the system to provide a reward or initiate a purchase. The reward may be provided in any suitable form to the transaction account (e.g., as a monetary credit or an offer that is loaded to the transaction account) and/or credited to a reward account associated with the user and/or the entertainment channel. The synced transaction account may be charged for the initiated purchase and that item associated with the purchase may be provided to the user.

In the context of a review channel (e.g., Trip Advisor), the system may be configured to verify an existing review or request a review in response to a purchase. In response to a sync between the review channel and the transaction account, the system may compare transactions associated with the transaction account to reviews for items associated with the user. If the system matches a review with a transaction, the system may certify or otherwise verify that the review was associated with an actual transaction. The system may also generate requests for reviews, in response to transactions for items being initiated or completed with the transaction account. In response to the review being submitted, the review system may certify or otherwise verify the review.

In the context of a reservation channel (e.g., Open Table), the system may be capable of creating a reservation for an item. In response to a sync between the reservation channel and the transaction account, the system may create a reservation for an item based on a user request. In response to the item being provided to the user by the merchant, the system may be capable of facilitating payment for the item (e.g., a meal) and updating an inventory associated with merchant (e.g., available tables at a restaurant). A record associated with the transaction may also be provided by the merchant to the user in the channel.

Phrases and terms similar to an "item" may include any good, service, merchant, information, experience, data, content, access, rental, lease, contribution, account, credit, debit, benefit, right, reward, points, coupons, credits, monetary equivalent, anything of value, something of minimal or no value, monetary value, non-monetary value and/or the like.

In various embodiments and as used herein, a digital channel may be any suitable channel available to a user over a network, including for example, a social media channel, an entertainment channel, a service channel, a review channel, a service scheduling channel, and/or the like. The channel may include a user interface and user account that may be created by a user. Moreover, the user may be able to access the digital channel through a web client on any suitable electronic device. The digital channel may also be considered a non-traditional purchasing channel (e.g., a channel where information about an item may be present, but where the ability to purchase the item is not traditionally available such as, for example, an item page in a social media channel where information about an item is available).

In various embodiments, the systems, methods, and computer program products (collectively, the "system") described herein may be capable of executing purchases for items, initiating transactions, providing purchase instructions, providing transaction instructions, and/or the like through digital channels (e.g., entertainment channels, social media channels, marketing channels, advertisements, and the like). The systems may also be capable of associating an activity with a transaction, such that the activity is certified, confirmed, or otherwise related to the transaction to verify the action in the channel. The system may sync, link, or otherwise associate a transaction account with a consumer in the channel. In response to the association, the system may track and/or receive information from a digital channel indicative of an activity with a consumer in the channel. If the activity corresponds to a purchase opportunity, the system may initiate a purchase or provide purchase instructions associated with the purchase opportunity. A merchant associated with the purchase opportunity may process the initiation or instructions. In response to the initiation or instructions complying with the terms of the purchase opportunity, the merchant may provide the item to the consumer and receive payment from the associated transaction account. For example, in a broadcast channel such as Twitter, the system may track or receive broadcasts (e.g., tweets) from consumers who have associated their transaction accounts with the broadcast channel. The system may analyze the content of the broadcast to identify a predetermined purchase indicator (e.g., a hashtag). In response to the broadcast including the purchase indicator, the system may initiate or provide instructions to a merchant to initiate a transaction and provide an item to the consumer. The system may require that the consumer confirm that the broadcast was intended to initiate a transaction for an item. As such, the system allows the consumer to purchase an item based on a broadcast and without have to use a traditional merchant channel (e.g., a brick and mortar location, a merchant or third party e-commerce site, and/or the like).

As used herein, a "merchant" may be any person or entity capable of providing a service or an item. A merchant may distribute the item in any way, for example, by exchanging the item for payment. The merchant may be capable of accepting the payment through any suitable payment channel including traditional payment channels including, for example, POS terminals, online payments terminals, transaction account networks and the like. The merchant may also accept payment through non-traditional payment terminals including, for example, social media channels, person to person payments. Further information about person to person payments is described in U.S. patent application Ser. No. 13/640,216, entitled Systems and Methods for Transferring Value via a Social Network, which is herein incorporated by reference in its entirety for any purpose.

In various embodiments and with reference to FIG. 1, a system 100 may comprise various hardware and software components including for example, a web client 110, a transaction account system 120 and a digital channel 130. System 100 may be capable of interfacing with a user through a web client 110 allowing the user to access one or more components of transaction account system 120 and/or digital channel 130. Moreover, transaction account system 120 and digital channel 130 may be operatively coupled or in communication with one another.

In various embodiments, transaction account system 120 may be any hardware, software, or hardware software system capable of associating transaction information with an activity in a digital channel. Transaction account system 120 may comprise a sync module 122, a monitoring module 124, a transaction module 126 and a rewards module 128. Digital channel 130 may comprise an activity monitoring module 132 and a sync module 134.

Figure 2A:
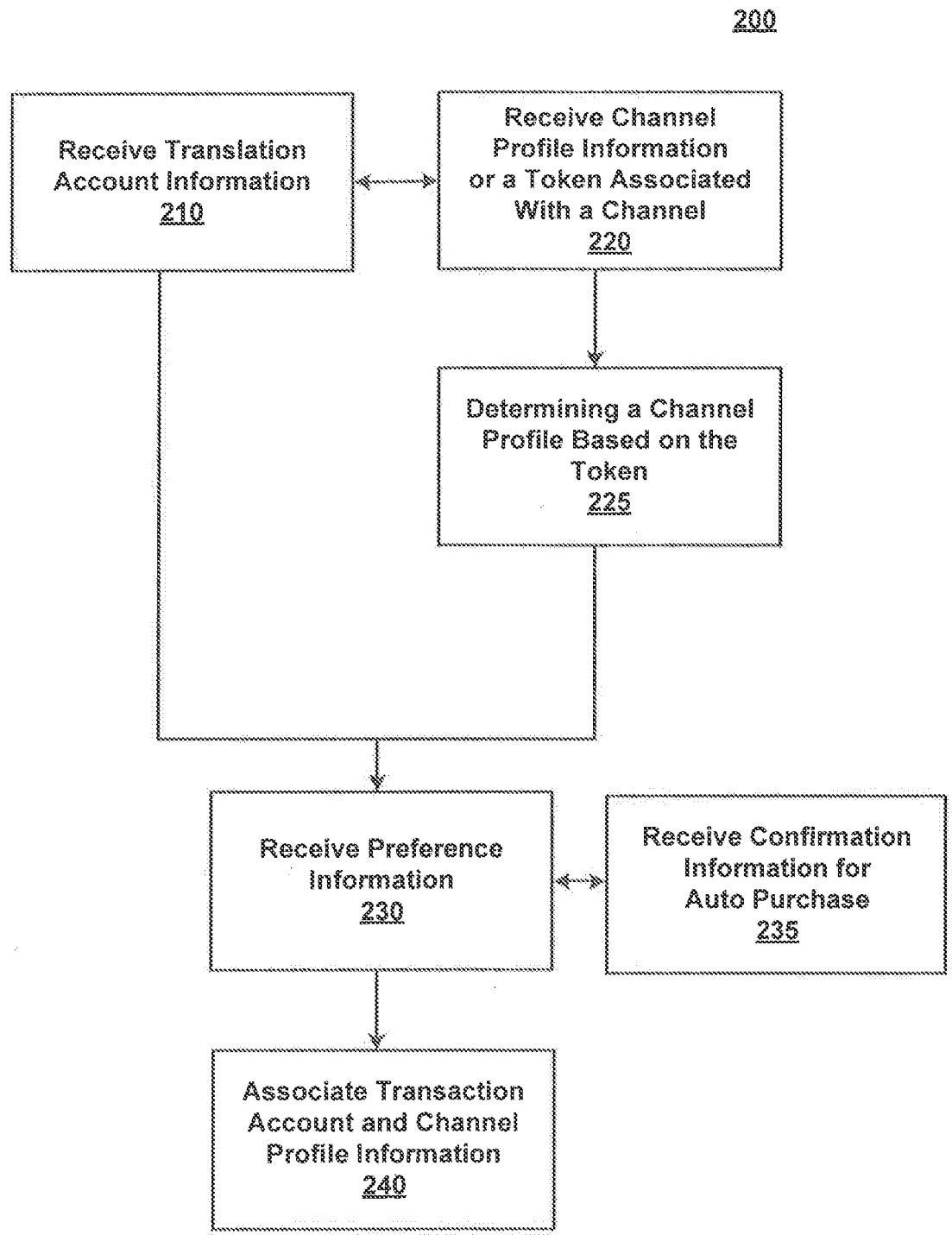
FIG. 2A shows an overview of a purchasing process, in accordance with various embodiments.

In various embodiments and with reference to FIG. 2A, a system 200 may be capable of associating or syncing a transaction account with a consumer profile for a channel. More specifically, system 200 may be configured to trigger rewards, purchases, and/or discounts based on activities in a channel. The rewards, purchases and/or discounts may be associated with or charged to the synced transaction account. As a result, in various embodiments, system 200 may be capable of initiating and/or a conducting one or more transactions for one or more items with a transaction account based on an action by a user in a digital channel (e.g., initiate a purchase based on an action in a social media channel). In other embodiments, system 200 may also be a verification system that is capable of verifying an activity in a channel based on a transaction from an associated transaction account (e.g., spend verification of a review). In other embodiments, system 200 may be a rewards system that is configured to monitor activities in a digital channel and provide rewards based on in channel accomplishments or activity levels via rewards module 128.

System 200 may receive transaction account information (Step 210). The transaction account information may be requested by or provided to system 200 through any suitable channel including for example sync module 122 of transaction account system 120 and/or sync module 134 of digital channel 130. For example, system 200 may be associated with a payment processor (e.g., transaction account issuer). In this example, sync module 122 may request the transaction account information through a channel provided by the transaction account issuer (e.g., a transaction account issuer website). The transaction account information may also be captured through sync module 132 at digital channel 130 by a digital channel provider, a third party, or by system 200. The transaction account information may be captured through a fillable form, through an API or other suitable channel interface. Thus, information needed to sync a transaction account with a channel may be captured in a digital channel, by the transaction account issuer, or by a third party.

System 200 may also be capable of receiving consumer profile information for the channel (Step 220). As noted above with respect to the transaction account information, the consumer profile information for the channel may be requested by or provided to system 200 through any suitable channel. The consumer profile information may also be provided in conjunction with or at substantially the same time as the transaction account information. For example, where the transaction account information is provided to system 200 through the digital channel, the consumer profile information for the channel may be automatically sent with the captured transaction account information. More specifically, the system capturing the data may request that the consumer be logged into or otherwise known to the digital channel in response to providing the transaction account information, such that, the digital channel can automatically provide the consumer profile information with the transaction account information. In operation, in response to a user syncing transaction account and consumer profile information through a digital channel, the digital channel may capture the transaction information in the channel through a form or other suitable data capture mechanism. The form may be provided securely by the channel provider or a third party. The transaction data and consumer profile data are sent to the transaction account issuer, so that the transaction account and the consumer profile can be synced.

System 200 may also receive a token or code associated with a channel (Step 220). The token or code may be used to associate the transaction account and a digital channel. For example, a token or code may be provided to the consumer by system 200, a third party, the digital channel and/or the like. The code or token may be presented in the channel (e.g., through an advertisement) or provided outside the channel in any suitable fashion. This token may be provided to system 200, along with transaction account information. Based on the token and transaction account information, system 200 may request, obtain or otherwise determine channel profile information to associate the transaction account with the channel (Step 225). System 200 may be capable of communicating this association back to the channel provider. Based on the association, the channel provider may be capable of monitoring the activities, accomplishments, trends, interests, and/or the like of the consumer. The channel provider may be further capable of communicating these activities, accomplishments, trends, interests, and/or the like to system 200.

System 200 may also provide an indicator or data associated with the transaction account to the channel provider. The channel provider may identify the consumer profile associated with the channel. Based on this identification, the channel provider may monitor or otherwise track and/or report the activities, accomplishments, trends, interests, and/ or the like of the consumer in the channel to system 200.

In various embodiments, system 200 may also be capable of requesting, defining, and/or associating preferences with the transaction account and/or consumer profile for the channel (Step 230). System 200 may allow the consumer to define various preference related to activities with a channel, purchasing, shipment, rewards, offers, and/or the like. For example, system 200 may allow the user to select whether to enter continuation information associated with the transaction account and/or consumer profile for the channel in response to making a purchase in a digital channel. The system may also either request that confirmation is provided for each transaction (e.g., purchase through a digital channel) and/or provide that each transaction is partially or fully completed automatically. Where transactions are completed automatically, system 200 may receive confirmation information associated with the transaction account and/or consumer profile for the channel in response to the consumer defining her initial preferences (Step 235).

As noted above, system 200 may also allow a consumer to partially or fully define other preferences. For example, system 200 may allow a user to define one or more shipping addresses to facilitate fulfillment of a transaction or purchase. System 200 may also allow a user to define how offers and/or rewards are earned, distributed, provided, and the like for transactions and/or purchase events. For additional information on how offers and/or rewards are earned, distributed, and/or provided, see for example, U.S. patent application Ser. No. 13/439,768, filed, Apr. 4, 2012, and entitled System and Method for Providing International Coupon-Less Discounts, U.S. Provisional Patent Application Ser. No. 61/710,461 filed on Mar. 14, 2012 and entitled "GENERATING MERCHANT RECOMMENDATIONS FOR CONSUMERS" and U.S. Provisional Patent Application Ser. No. 61/646,778 filed on May 14, 2012 and entitled "SYSTEMS AND METHODS FOR TAILORED MARKETING BASED ON FILTERING," each of which is incorporated by reference in its entirety for all purposes.

Figure 2B:
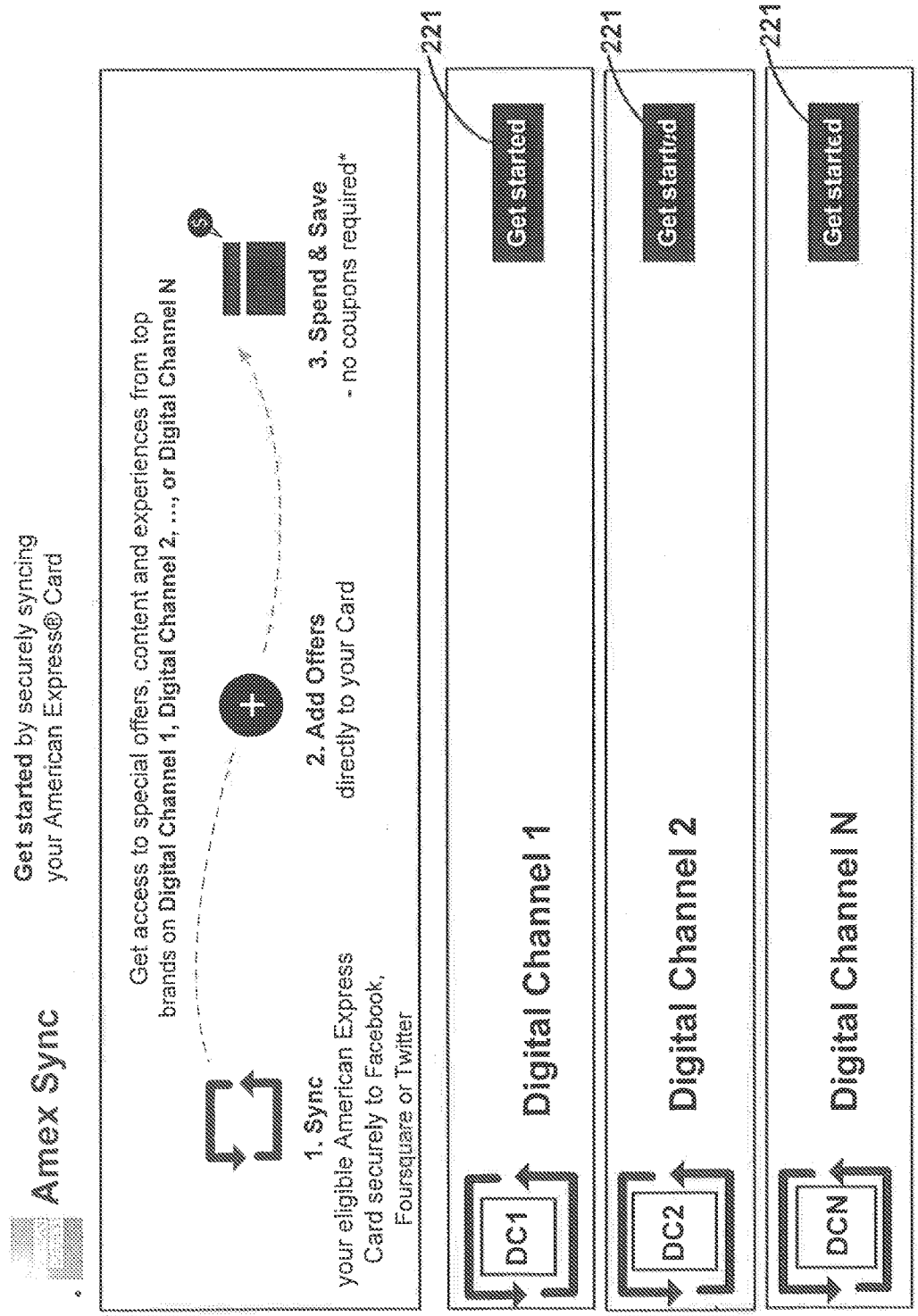
FIG. 2B shows a screenshot of a user interface for syncing a transaction account with one or more digital channels, in accordance with various embodiments.

As part of preference selection, system 200 may provide a user with the option to associate multiple channels with a single transaction account or multiple transaction accounts with one or more channels. For example and with reference to FIG. 2B, if a user has several digital channels and/or social media profiles (e.g., Facebook, Foursquare, Twitter, LinkedIn, and/or the like), system 200 may provide a user with the option to select multiple channels to sync with the transaction account. System 200 may present the user with selectable links 221 that trigger a sync or association between the channel and the transaction account. System 200 may also request information for each of the digital channels and/or social media profiles. This central linking capability, illustrated in FIG. 2B, creates a convenient and efficient solution for the user to link her transaction account(s) with multiple channels through a single interface.

System 200 may also be capable of associating the transaction account information and consumer profile information for the channel and/or profile (Step 240). This association enables the transaction account to be used for transactions in response to an action being detected in a channel. For example, if the channel is a broadcast service (e.g., Twitter), a broadcast (e.g., a Tweet) may be monitored by system 200 or any other suitable system to determine whether the broadcast contains or conforms to a predefined action (e.g., a hashtag, a keyword, and/the like). In response to detecting or receiving the action (or data indicative of the action), system 200 through transaction module 126 may initiate a purchase for the consumer based on the preferences defined by the user. Moreover, if the channel is an entertainment channel (e.g., XBox), an action (e.g., an in-game accomplishment, an in-game activity, and/or the like) may be monitored by system 200 via monitoring module 124 or any other suitable system to determine whether the activity contains or conforms to a predefined action. In response to detecting or receiving the action or a selection associated with the action (or data indicative of the action or selection), system 200 may initiate a purchase for the consumer based on the preferences defined by the user. In this way, system 200 transforms any digital channel into an e-commerce channel, by tracking actions of digital channel users to identify activities that trigger purchases.

Figure 2C:
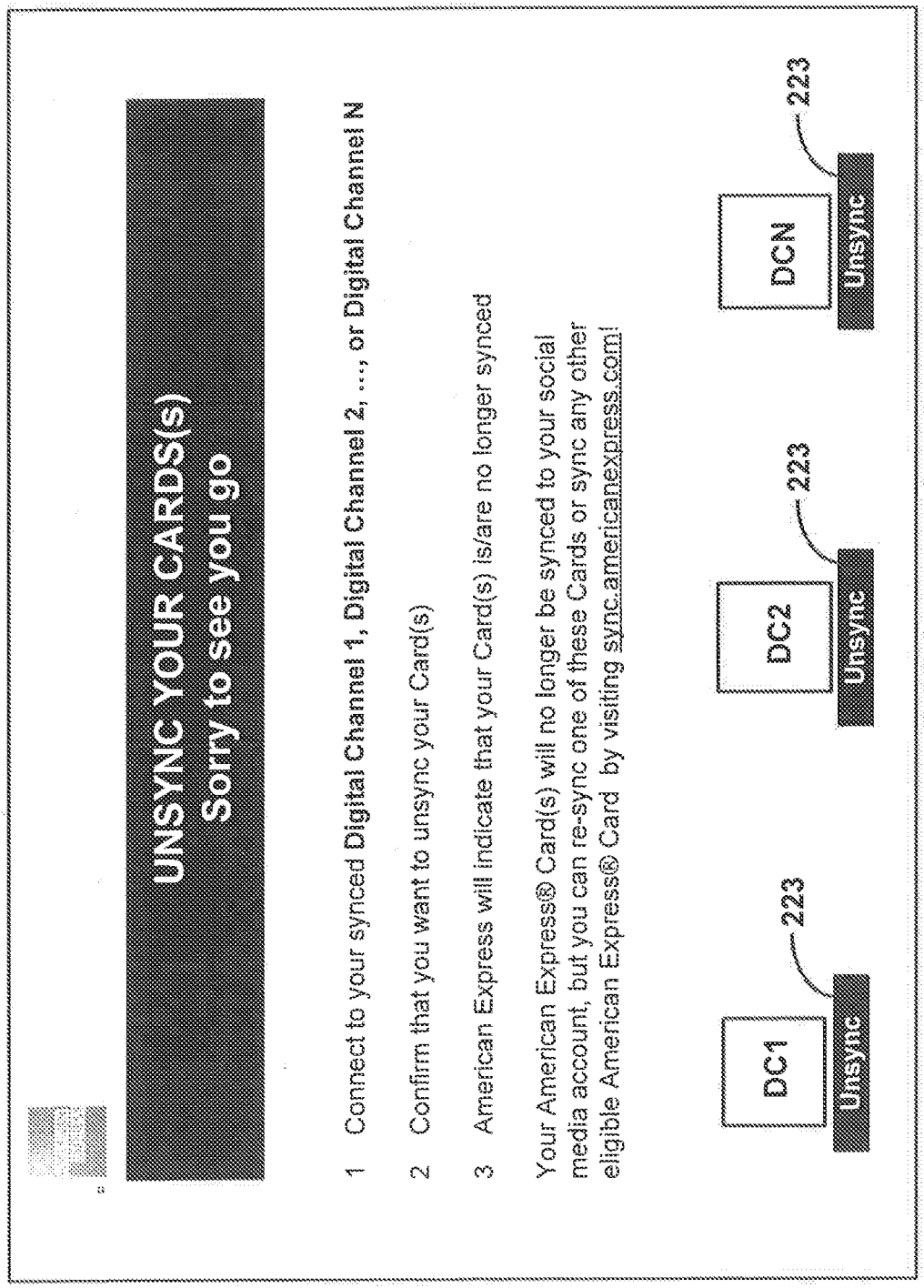
FIG. 2C shows a screenshot of a user interface for unsyncing a transaction account with one or more digital channels, in accordance with various embodiments.
Figure 2D:
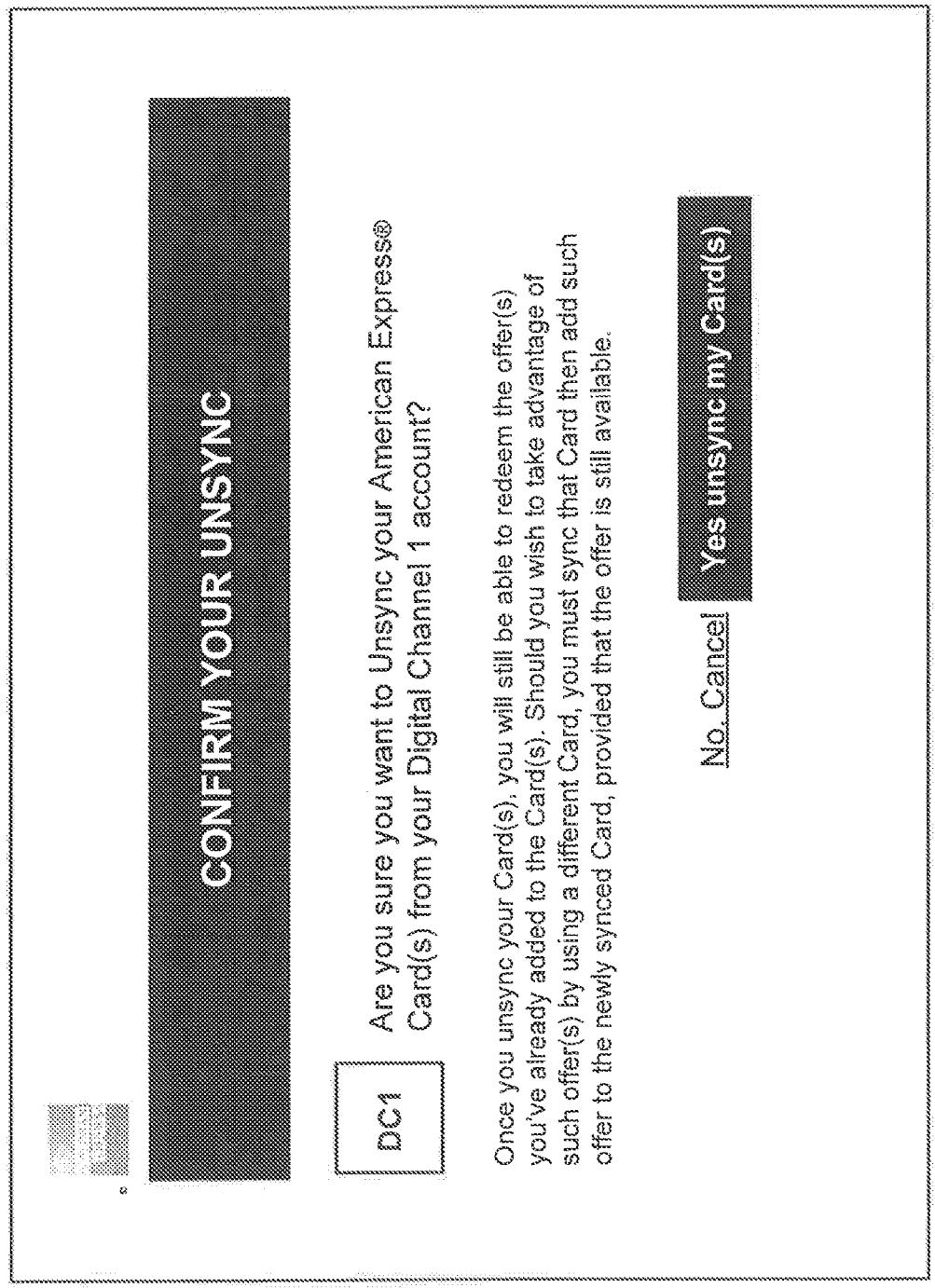
FIG. 2D shows a screenshot of a confirmation page in response to unsyncing a transaction account with one or more digital channels, in accordance with various embodiments.

In various embodiments and with reference to FIG. 2C and FIG. 2D, system 200 may also be capable of un-syncing or disassociating a transaction account and a digital channel. For example, if a user wishes to end the association between the user's transaction account and channel profile, the user may access system 200 and select one or more channels from which the user wishes to un-sync. System 200 may present the user with the one or more digital channels (e.g., digital channel 1 ("DC1"), digital channel 2 ("DC2") . . . and/or digital channel N ("DCN")) that are synced with the user's transaction account and enable the user to selectively or completely un-sync the one or more channels and the transaction account. For example and as illustrated in FIG. 2C, the each of DC1, DC2 and DCN may be presented to the user with an associated un-sync option 223 (e.g., button or link 223). By selecting the un-sync option 223, system 200 may request that the user provide confirming information or system 200 may automatically un-sync or disassociate the transaction account and the selected channel. System 200 may further provide the user with a confirmation that the selected channel(s) is un-synced, as shown in FIG. 2D.

Figure 3:
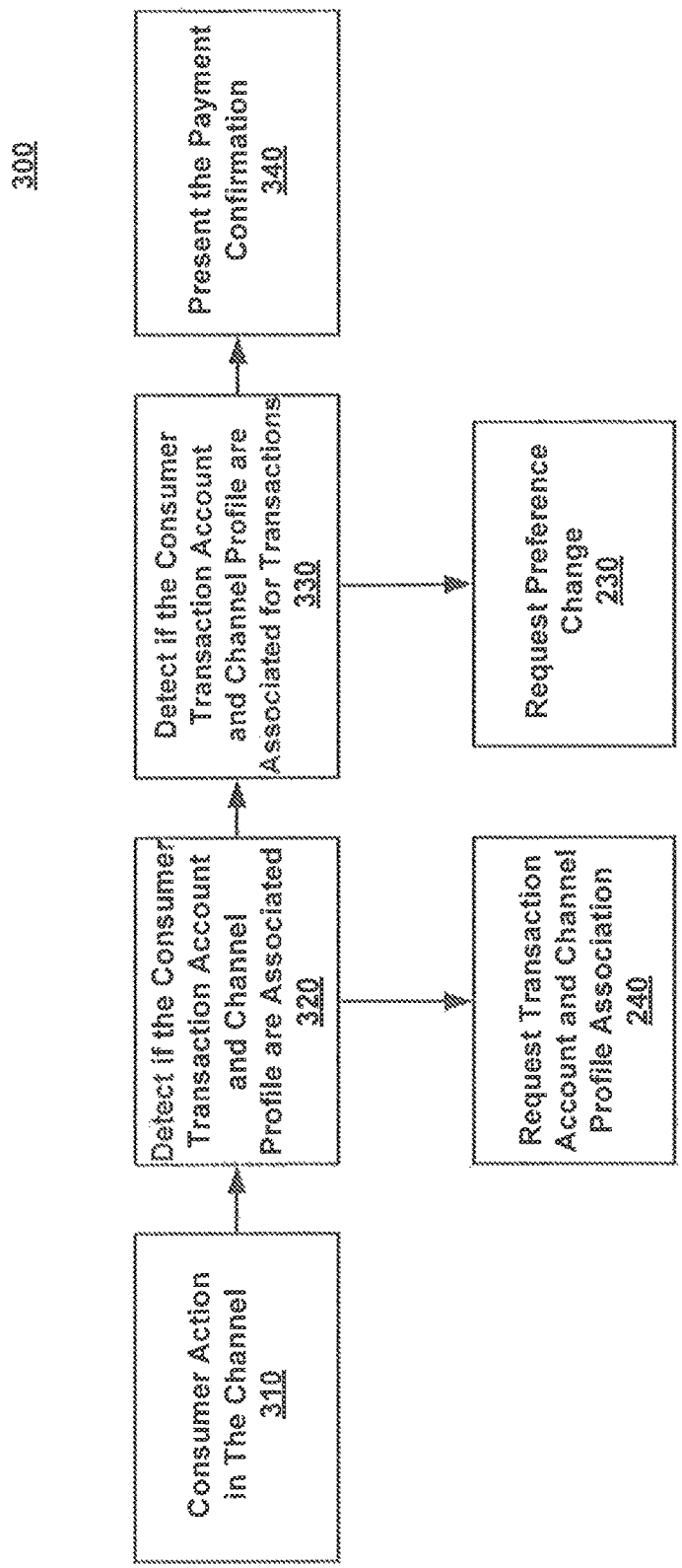
FIG. 3 shows an overview of a purchasing process, in accordance with various embodiments.

In various embodiments and with reference to FIG. 3, system 300 may be capable of monitoring activities in a digital channel (e.g., initiating a purchase based on an action in a digital channel) through monitoring module 124 of transaction account system 120 or activity monitoring module 132 of digital channel 130. A consumer who is a user of a digital channel) may interact with a channel in various ways (Step 310). For example, a consumer may be a user of a broadcast channel (e.g., Twitter, Facebook, You-Tube, a messaging service, and/or any other suitable broadcast channel) or an entertainment channel (e.g., a gaming counsel (e.g., XBox), a video counsel (e.g., Apple TV), music service (e.g., Pandora), and/or the like) and may take actions in the channel (e.g., make broadcasts). The broadcast channel, monitoring module 124, activity monitoring module 132, or any other suitable system may monitor broadcasts from the user. These broadcasts may be provided to or acquired by system 300. In addition to the content of the broadcast, the source of the broadcast may also be provided (e.g., the user/consumer).

For example, system 300 may analyze the broadcast to confirm that the broadcast satisfies a certain action and/or content (e.g., a hashtag, a keyword, a code, interest selection, like, thumbs up, or any other suitable action and/or content). System 300 may also analyze the user or source of the broadcast. System 300 may first determine whether the consumer's transaction account and channel profile are suitably associated (Step 320). If the transaction account and channel are not associated, the system 300 may request that the transaction account and channel profile be associated (Step 240). This may be accomplished in any suitable way such as, for example, according to the process described herein with respect to FIG. 2. If the transaction account and channel profile are associated, system 300 may determine whether the transaction account and the channel profile are associated for transactions (Step 330). If the transaction account and channel profile are not associated for transactions, system 300 may request a preference change (Step 230). If the transaction account and channel profile are associated for transactions, then system 300 may present payment confirmation (Step 340).

Where the digital channel is a broadcast channel such as, for example, a short message service (e.g., Twitter), the broadcast channel may receive and distribute all broadcasts. In this way, the broadcast channel may be able to monitor or analyze broadcasts for the specific action. The broadcast channel may also be configured with a mechanism capable of identifying particular actions. In the context of Twitter, the action may be a predefined hashtag, keyword, and/or the like.

The action may be a hashtag that comprises the "#" sign and a symbol or keyword, as is commonly used to characterize or categorize a broadcast. The action may be any other indicator, media, event, data, act, and/or the like that is predetermined or dynamically determined by the entity making or distributing the purchase event. The action may comprise elements or symbols that are associated with the entity offering or distributing the purchase event (e.g., a branded action). For example, a purchasing event sponsored by a merchant and distributed by American Express may comprise elements of the name of the merchant (e.g., ME for Merchant A) and elements of American Express (e.g., AXP for American Express). In this example, the action may be #MEAXP. It should be understood that the action may also comprise text, pictures, video, graphical elements, symbols, sounds, act, media, data and/or the like. The action may also comprise any predetermined or dynamically determined elements or symbols that describe the purchase event or are arbitrary.

Where the hashtag is used and the broadcast channel account used to broadcast the hashtag is public, system 300 or an entity administering a purchase program in the broadcast channel can identify the user who broadcasted the action (e.g., a hashtag, keyword, or the like) by searching for a particular action among publicly available broadcasts. Broadcasts can also be linked to other social media channels or broadcast channels such as Facebook, LinkedIn, or any other publicly accessible website using a broadcast channel API or widget (e.g., the Twitter widget). The broadcasts may be displayed within a social media or publicly accessible website, so that the merchant or entity administering the purchase event can identify what users are broadcasting to take advantage of the purchase event.

The merchant or the entity administering the purchase event may also follow a user who associates a transaction account for purchases based on broadcasts. In this case, the merchant or entity administering the rewards program may receive every broadcast from the user and may be able to determine whether one or more of the user's broadcasts included the action. In response to the merchant or entity administering the purchase event having identified a broadcast that contains the action, a purchase associated with the purchase event may be initiated and an appropriate transaction associated with the purchase may be charged to the transaction account associated with the user.

Purchase events may be advertised, provided, or otherwise distributed to users that follow a merchant, manufacturer, distributor, a sponsoring entity and/or the like on a broadcast channel. Notifications of purchase events may also be distributed through any other suitable channel. The notification may contain details of the item, the digital channel where the purchase event may occur and/or the action for redeeming the purchase event.

Where the digital channel is an entertainment channel such as, for example, gaming channel (e.g., XBox), the channel may receive and distribute all actions. In this way, the entertainment channel may be able to monitor or analyze actions for a predefined action. The entertainment channel may also be configured with a mechanism capable of identifying particular and/or specific actions or levels of actions. In the context of a gaming channel, the action may be a predefined in channel activity, level of accomplishment, activity and/or the like.

The action may be any suitable action in the gaming channel. For example, in a sports game (e.g., a golf game), the action may be the selection of a particular virtual piece of equipment. Similarly, the action may be a particular level of accomplishment in a particular game or with a particular piece of virtual equipment. Moreover, the purchase opportunity may be associated with the action. For example, a level of accomplishment in a particular gaming environment may allow a user to purchase a particular reward. For example, a particular level of accomplishment in a golf theme game may allow a user to purchase tickets or otherwise acquire tickets to a golf themed event (e.g., the Masters Golf Tournament, the Phoenix Open, and/or the like). An action associated with a particular virtual piece of equipment may allow a consumer to purchase the equipment for use on the golf course (e.g., a selection of a virtual club may allow a user to purchase the actual club). Moreover, the particular accomplishment or action may allow the consumer to acquire the item associated with the virtual action or accomplishment at a discounted price or as a reward.

Where the action or accomplishment is available in a public entertainment channel, system 300 or an entity administering a purchase or rewards program in the entertainment channel may be capable of identifying the user associated with the accomplishment or action. The actions may be posted or noticed through any suitable channel. For example, the action and/or accomplishment may be visible or noticed through a publicly available accomplishment board (e.g., a scoreboard, a community accomplishment board, and/or the like). The entertainment channel may also be associated with a social media channel (e.g., Facebook, Twitter, and/or the like) such that the action or accomplishment may be broadcast or otherwise associated with the social media channel. As such, system 300 or an entity responsible for administering a purchasing program in a digital channel (e.g., an entertainment channel) may be capable of monitoring public channels for actions and/or accomplishments.

Purchase events may be advertised, provided, or otherwise distributed to users through the entertainment channel in a virtual environment (e.g., in an in-game experience). Notifications of purchase events may also be distributed through any other suitable channel. The notification may contain details of the item, the digital channel where the purchase event may occur and/or the action for redeeming the purchase event.

Payment confirmation may include a user taking action or may be a notification that a transaction has been partially or fully initiated, processed, or completed. In various embodiments, system 300 may request that the user provide transaction account details to confirm that the transaction is authorized by the user. For example, system 300 may request a verification code, the zip code associated with the billing address, a password, or any other suitable verification information. This information may be requested through the channel or may be requested in any other suitable way (e.g., a link provided to the consumer through an electronic message). In various embodiments, the confirmation details for a transaction may also be automatically supplied if the consumer provided confirmation information in response to the consumer being initially linked to the transaction account and the channel profile. As such, the transaction or purchase initiated based on the in channel action may proceed without requiring a confirming action from the consumer. Based on an action initiating a purchase, the channel or system 300 may provide the consumer with a confirmation notification. This notification may contain purchase details including for example, transaction account information, item information, channel profile information, and or the like.

As described herein, system 300 may also be configured to monitor and provide rewards for in channel accomplishments. The in channel accomplishments may be any suitable level of achievement (e.g., accomplishing tasks in a video game), duration of use (e.g., using a music service for at least a threshold amount of time), and/or a type of use (e.g., using a music service to listen to music from a particular artist).

Figure 4:
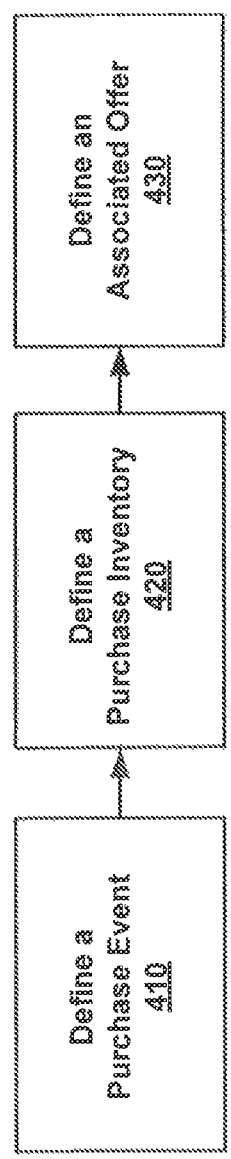
FIG. 4 shows an overview of a process to define a purchasing event, in accordance with various embodiments.

In various embodiments and with reference to FIG. 4, a merchant may define a purchase event. The purchase event may allow a consumer to purchase an item through a digital channel with an action in the channel. The merchant may define an inventory, terms and conditions, the action, and any other suitable parameters for the purchase. The merchant may access system 400 through any suitable purchase or offer creation channel including, for example, U.S. Ser. No. 13/153,890, entitled System and Method for Administering Marketing Programs, which is hereby incorporated by reference in its entirety for all purposes. The merchant may define a purchase event in any suitable fashion (Step 410). For example, the merchant may define a start date, an end date, a channel, an item, an action, an offer, and/or any other suitable term. The merchant may also define a purchase inventory in system 400 (Step 420). The merchant may define a fixed or pre-defined inventory or items or a dynamically determined inventory or items. For example, the merchant may associate an item for purchase or acquisition with a particular accomplishment, media, virtual element, action or other suitable action in the entertainment channel.

In various embodiments, this inventory may be determined based on market projections, initial success of a purchase event campaign, or any other suitable parameter. For example, system 400 may be configured to monitor a purchasing event in substantially real time (e.g., within minutes, hours, or days of an action defined by the merchant offering the purchasing event). Based on this monitoring, system 400 may be capable of providing the merchant with real time interest data for the purchasing event. This real time interest data may enable a merchant to dynamically adjust the inventory of an item available to system 400 based on the interest in the particular purchasing event. This reporting allows the merchant and system 400 to dynamically adjust the inventory of the item in real time.

In various embodiments, the merchant may also define an offer associated with items in the inventory (Step 430). The merchant may provide an offer to system 400 to encourage purchases through the digital channel. These offers may be associated with the predefined action provided by the merchant in response to the merchant defining the purchasing event. The offer may also be associated with the item. For example, the merchant may provide an instant rebate offer. In this example, system 400 may receive the predefined action through the digital channel and, based on the action, evaluate available offers for a purchase event or an item. If the action complies with the purchase event or the item, system 400 may adjust the price of the item based on the offer. The offer may apply only to items purchased through the purchasing event. The offer may also apply to the purchase of an item through traditional and/or digital channels.

Figure 5:
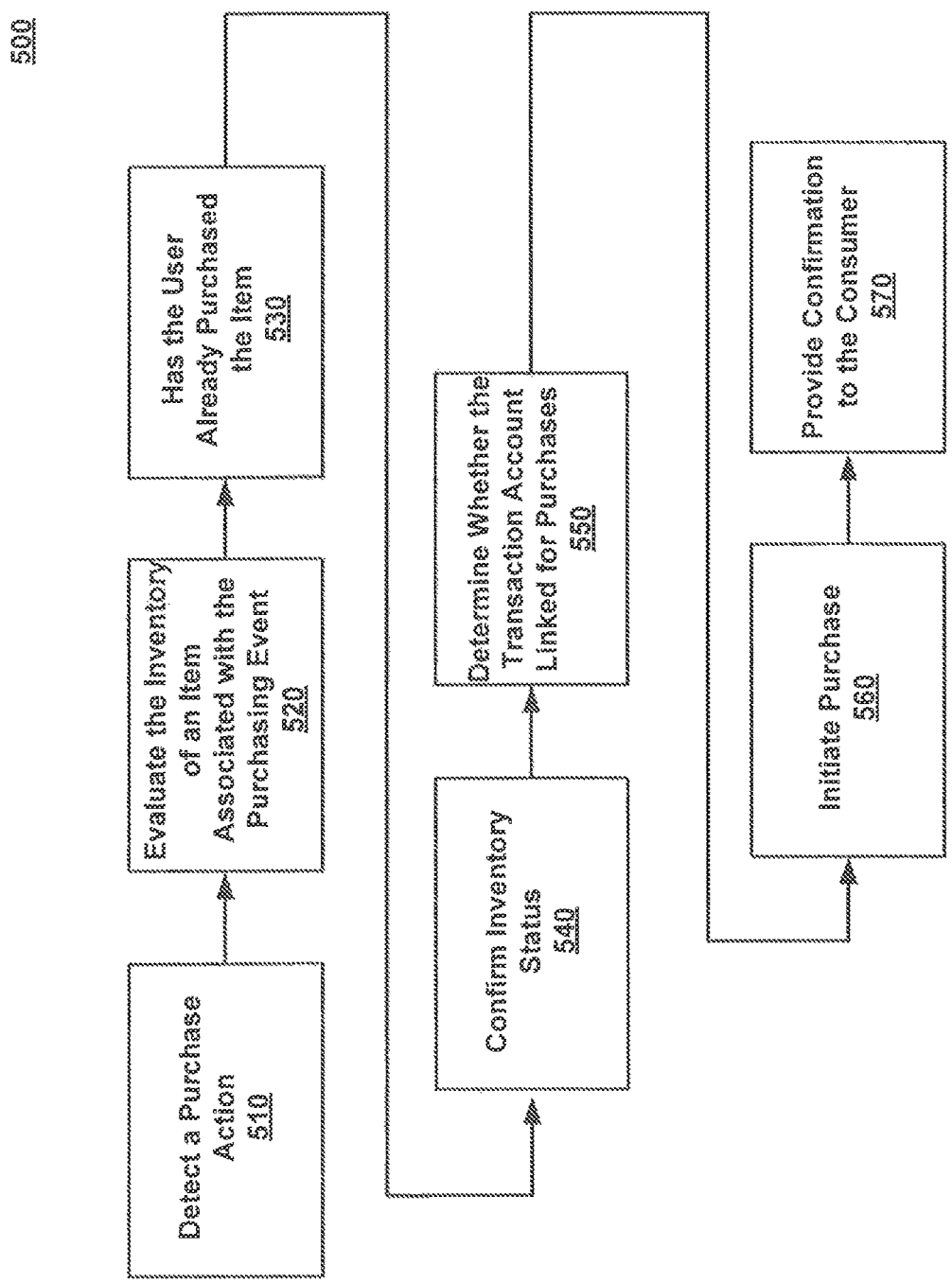
FIG. 5 shows an overview of a process to initiate a transaction in a digital channel, in accordance with various embodiments.

In various embodiments and with reference to FIG. 5, system 500 may be capable of conducting purchase operations in any suitable fashion via transaction module 126. System 500 may be capable of detecting a purchase action in a channel (step 510). The action may be a broadcast (e.g., a tweet) or any other suitable operation. Based on or in response to this action, system 500 may be capable of analyzing the terms of the purchase event. For example, system 500 may determine whether a particular purchase event is active based on the start date and/or end date associated with the purchase event. If the purchase event is inactive, system 500 may provide a consumer with details regarding the purchase event.

If the purchasing event is active, system 500 may evaluate the inventory of an item associated with the purchasing event (Step 520). If no inventory is available (or insufficient inventory), system 500 may provide a notification to the consumer indicating that the item is no longer available for purchase or that inventory for an item is not available, but is being requested. If inventory for an item is available, system 500 may analyze the spend history of the transaction account associated with the purchase event (e.g., if the consumer has previously purchased the item associated with the purchase event) (Step 530). If the transaction account associated with the purchase event has already purchase the item, system 500 may request a confirmation for the consumer that a multiple purchase is authorized.

If the consumer has not previously purchased the item or if the consumer indicates the she wishes to purchase multiple items, system may be capable of evaluating the inventory status of the item (Step 540). System 500 may also be capable of determining whether a transaction account is linked for purchasing an item (Step 550). If the transaction account is not linked for purchasing an item through digital channels, system 500 may be capable of requesting that the user link or update the preferences associated with the transaction account to confirm that purchases may be made through digital channels as described above.

Based on the transaction account being linked to the profile to conduct purchases, system 500 may initiate, conduct, transmit, complete or otherwise authorize the purchase of an item (Step 560). In various embodiments, system 500 may also associate an offer, discount, reward, incentive, and/or the like with the purchase and/or action in the channel. Based on the purchase, system 500 may request confirmation as described above or provide a notification or a transaction associated with an action in the channel (Step 570). This notification may be provided through the channel where the purchase was initiated or through an alternative channel. This notification may be provided in substantially real time based on the transaction substantially instantly, and/or within minutes or days of the transaction and/or action in the channel).

Figure 6:
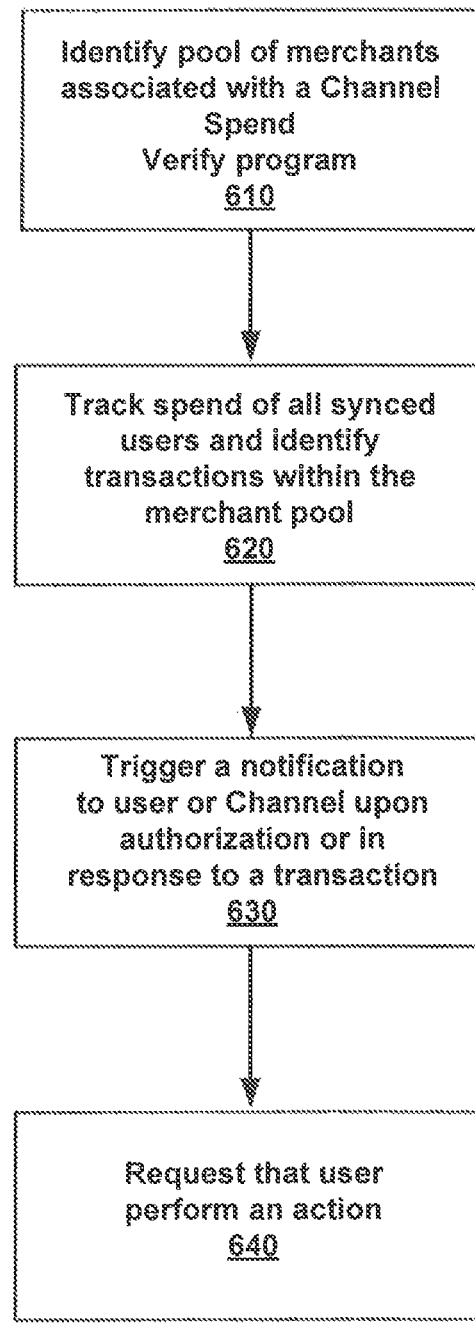
FIG. 6 shows an overview of a process for initiating a spend verified review, in accordance with various embodiments.

In various embodiments, and with reference to FIG. 6, system 600 may be a verification system capable of requesting an action in a channel based on a transaction. That action may be further verified (e.g., spend verified) based on the transaction that initiated the request for the action. System 600 may be capable of identifying items associated with a user activity. System 600 or the channel may be capable of identifying a pool of merchants, items, user and/or the like that are associated with a channel spend verify program (Step 610). To be part of the pool, the merchant, item, user and/or the like may have shopped at a particular merchant, purchased a particular item, conducted a defined type of transaction, used a particular transaction account and/or the like. Based on being included in the pool, system 600 may identify a user as a synced user. System 600 may further monitor transaction information associated with a synced user's transaction account to identify transaction that the synced user conducts with a merchant that is associated with the channel spend verification program (Step 620).

System 600 may be capable of triggering a notification or creating notification instructions in response to detecting a transaction or authorization at a merchant associated with the pool (Step 630). The notification or notification instructions may be provided to the channel. System 600 may also be capable of transmitting the notification directly to the user to request that the user perform an action in the channel (Step 640). Similarly, the channel may transmit a request to the user to perform an action in the channel based on, or in response to, receiving the notification from system 600.

The notification may include a link (e.g., a hyperlink) to an item profile (e.g., a merchant profile, a product profile, and/or the like) in the channel. The notification may also contain transaction information and information regarding the action. For example, the notification may request that a user provide a review for a particularly identified transaction that the user recently completed at a merchant and/or for an item. The notification may further indicate that the review will be spend verified based on the transaction.

Figure 7:
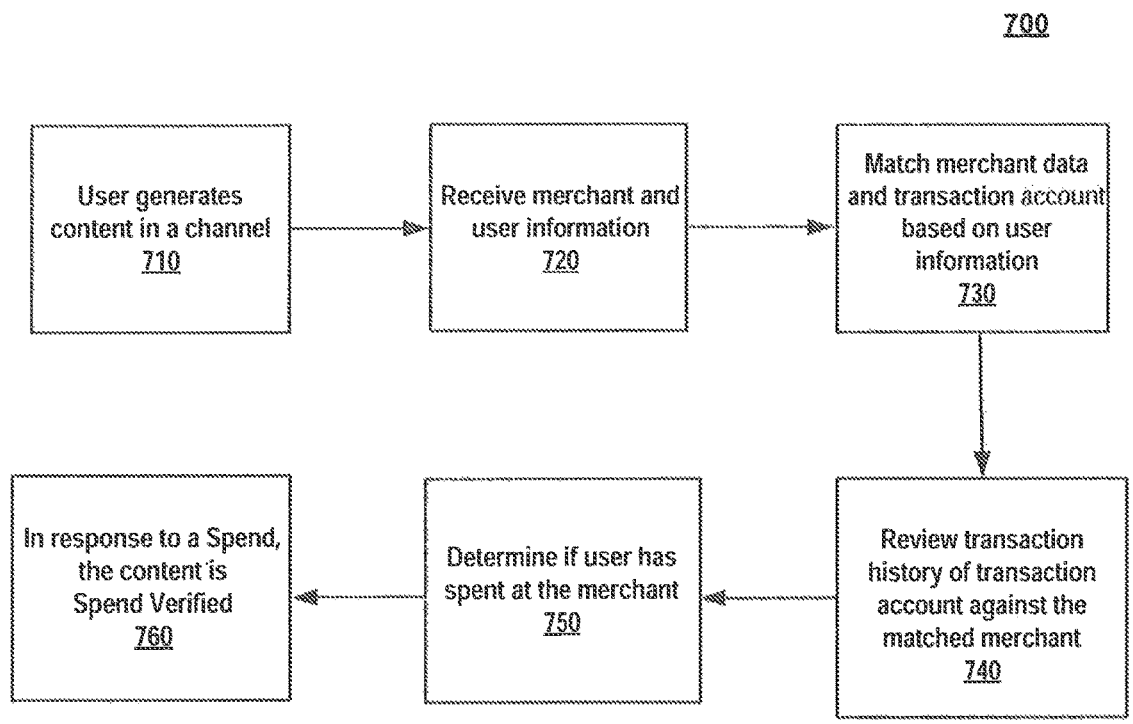
FIG. 7 shows an overview of a process for verifying a review based on spend data, in accordance with various embodiments.

In various embodiments, and with reference to FIG. 7, system 700 may be a verification system capable requesting verification (e.g., spend verification) of an action in a channel based on a transaction and in response to receiving the action in the channel. The user may generate content or take an action in a channel (Step 710). For example, the user may review a hotel on a travel services review website (e.g., <tripadvisor.com>). System 700 may receive user information and merchant information from the channel in response to the action (Step 720). System 700 may further identify the particular merchant and the transaction account associated with the user (Step 730).

In response to the user being a synced user, system 700 may review the transaction history of the identified transaction account against the associated merchant. (Step 740). System 700 may further determine if the user has spent at the merchant based on the transaction history associated with the transaction account (Step 750). System 700 may further analyze the details of the transaction to determine whether a particular transaction can be used for spend verification based on predetermined rules. In response to the transaction information at least partially conforming to the rules, system 700 may provide a verification or verification instructions to the channel such that the action or content is spend verified (Step 760).

As noted herein, a user may define preferences when the user syncs her transaction account and her channel profile. As such, system 700 may be capable of determining whether particular actions or content may be verified based on the preferences defined by the user.

In various embodiments, system 600 and system 700 may be further configured to annotate the reviews and/or content that are spend verified or otherwise certified. For example, system 600 and system 700 may be capable of annotating or otherwise associating an indicator (e.g., a badge) with the user provided review or content to promote, draw attention to, or otherwise verify the review. Moreover, the indicator may include an annotation that indicates the source of the payment or spend (e.g., "American Express Spend Verified").

Figure 8:
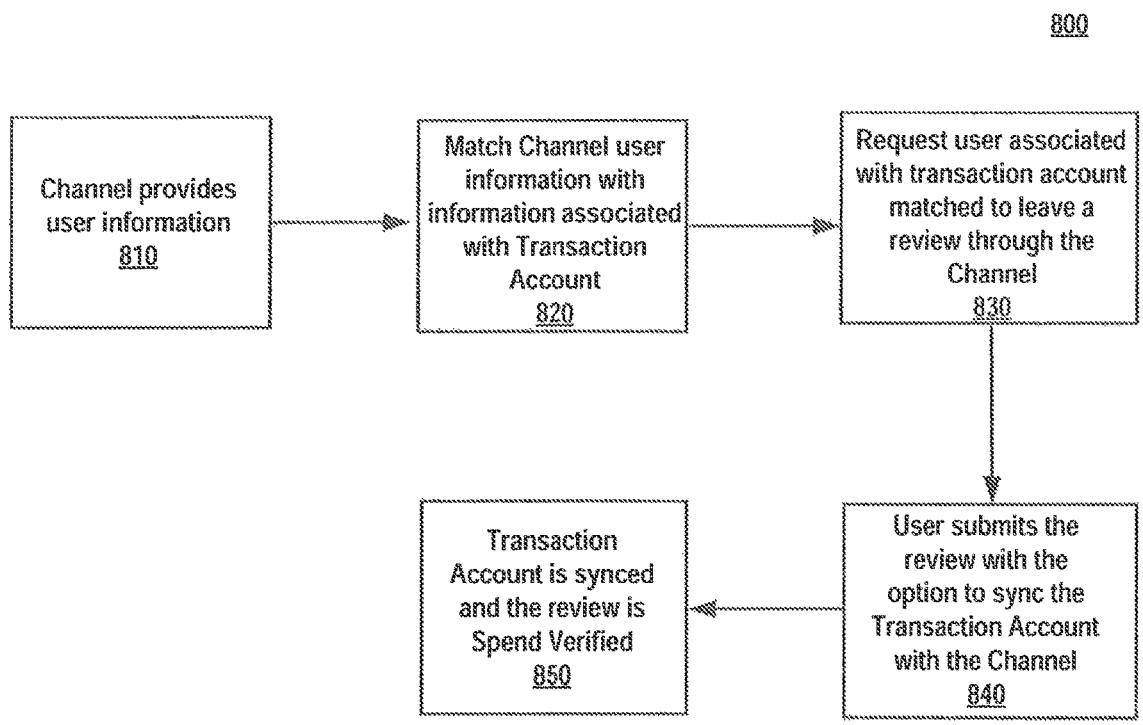
FIG. 8 shows an overview of a process for verifying a review based on spend data where a channel and a profile are not initially associated, in accordance with various embodiments.

In various embodiments, and with reference to FIG. 8, a channel may provide user information of its user base to system 800 (Step 810). For example, the channel may provide an e-mail address for each user that has provided a review. System 800 may determine that the user information received from the channel is associated with information associated with a transaction account (Step 820). For example, system 800 may access e-mail address associated with a transaction account and compare them with the e-mail address provided by the channel. In response to the e-mail address associated with the transaction account at least partially satisfying an e-mail address provided by the channel, system 800 may send a request to the user to provide a review of an item or a merchant (Step 830). The user may be directed to the channel to provide a review based on the request from system 800. The request may also contain an opt-out selection that allows the user to indicate that the user does not want to take an action in a channel.

System 800 and/or the channel may receive the action (e.g., a review) from the user. Based on receiving the action, system 800 may present the user with the option to sync the user's transaction account with the channel (Step 840). The sync may be accomplished by any suitable process including the process described herein with respect to FIG. 2. In response to the user syncing the transaction account with the channel, system 800 may send a verification or verification instructions to the channel to verity the action or content from the user in the channel (Step 850).

In various embodiments, system 800 may be capable of providing a verification and/or verification instructions if a user is not synced. For example, the channel may provide user information (e.g., an e-mail address) for a channel user in response to the user taking an action or providing content in the channel. The channel may also provide merchant and/or item information associated with the action and/or content. System 800 may associate the channel user information with information associated with a transaction account to determine an identified transaction account. System 800 may also associate the merchant and/or item information with transaction information associated with the identified transaction account. If the transaction information at least partially satisfies the merchant and/or item information provided by the channel, system 800 may provide a verification and/or verification instructions for the action and/or content provided by the user in the channel.

In various embodiments, and with reference to FIG. 9, the verification system may be configured to analyze channel profile information and transaction information in any suitable fashion. The data may be compared or associated based on one or more parameters, including parameters associated with the transaction account and the channel profile. The channel may initially provide profile data including for example, a user name and/or e-mail address and a date of action (e.g., review). The channel may also provide supplemental information including, for example, a merchant name and/or item name and a date of birth (DOB) associated with the channel user. The verification system may be capable of analyzing and associating the information provided by the channel with information associated with one or more transaction accounts. For example, the verification system may identify a transaction account based on a username and/or e-mail address and a DOB. The system may further evaluate transaction associated with the transaction account based on one or more of a merchant name, a date of an action/transaction, and/or the like.

The verification system may be capable of preparing a look-up or comparison table 900 associated with the submission of channel information by the channel. Table 900 may compare one or more data elements provided by the channel and reconciled by the verification system including, for example, the username (line item 910), the DOB (line item 920), the merchant name (line item 930), and/or the date of action/transaction (line item 840). The verification system may be configured to analyze the elements of table 900 to against predetermined rules. For example, the verification system may be configured to particularly identify a merchant and/or item based on the information provided by the channel. This identification may include an identification code, location, store number, item number (e.g., SKU, UPC, QR code, and/or the like) and/or the like. Moreover, the verification system may be capable of analyzing the channel information and the information associated with the transaction account (e.g., the details of the transaction information) to determine whether a particular transaction is appropriate for a verification of an action. The predetermined rules may be defined as a time period (e.g., less than one (1) year between the date of the review and the date of the transaction), an amount (e.g., a minimum spend), and/or the like. Based on this analysis, the verification system may provide a verification and/or verification instructions for the channel action and/or content.

Figure 10:
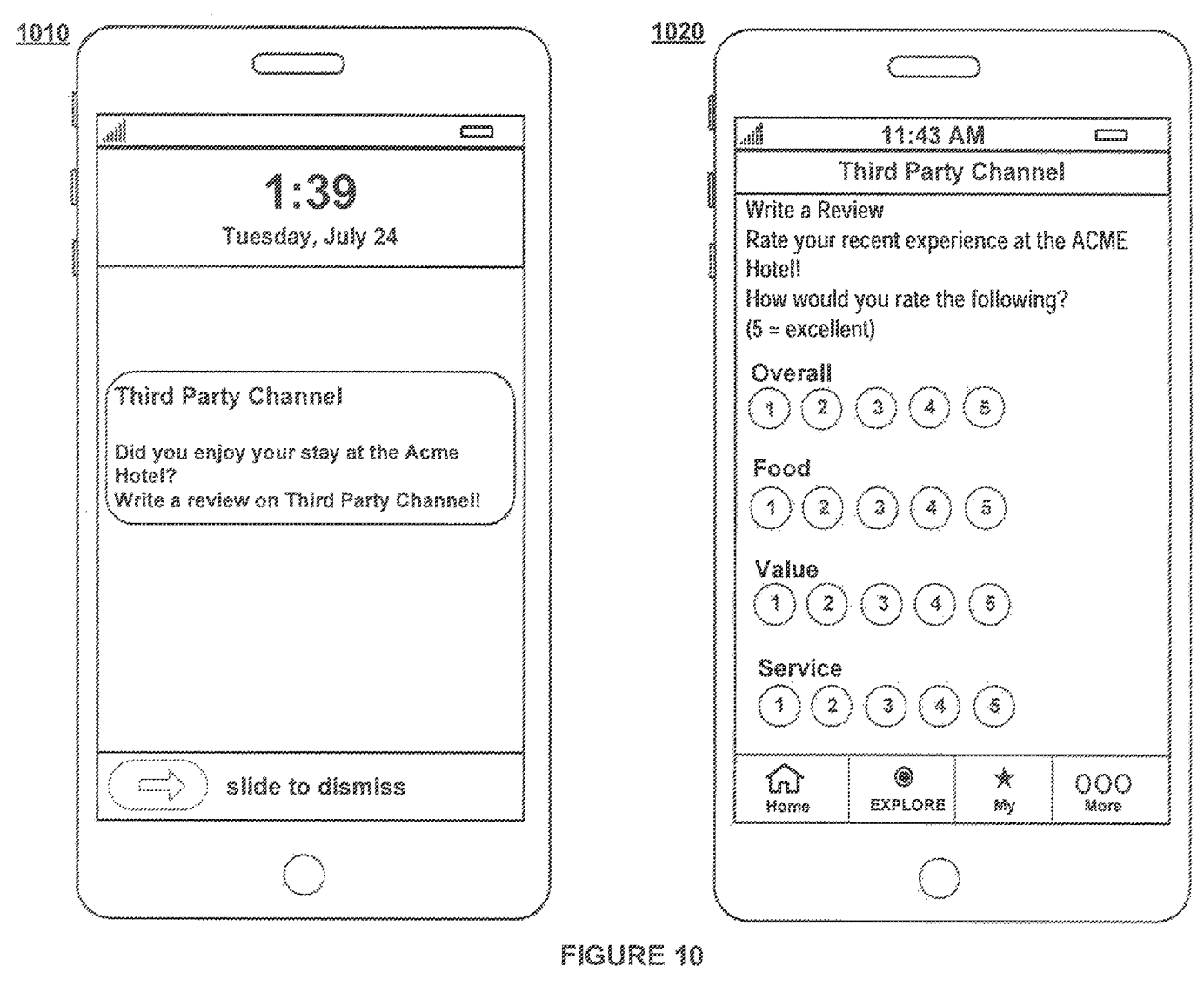

In various embodiments, and with reference to FIG. 10, the system and/or channel may be configured to provide a request for review and/or a review to a user in real-time relative to a transaction and/or authorization. The system and/or channel may be capable of pushing a request for an action 1010 in the channel through an electronic device (e.g., through a micro-app). The verification system and/or channel may be further configured to provide a survey 1020 through the electronic device. For example, the system and/or channel may be capable of distributing a request for action in response to an action in a channel or a transaction through any suitable real-time (i.e., relative to the action or transaction) channel. The real-time channel may include an electronic device such as, for example, a Smartphone, a tablet, an entertainment channel, a mobile channel, a micro-app, and/or the like. Based on the response by the user, the action in the channel may trigger the system and/or the channel to verify an action.

Figure 11:
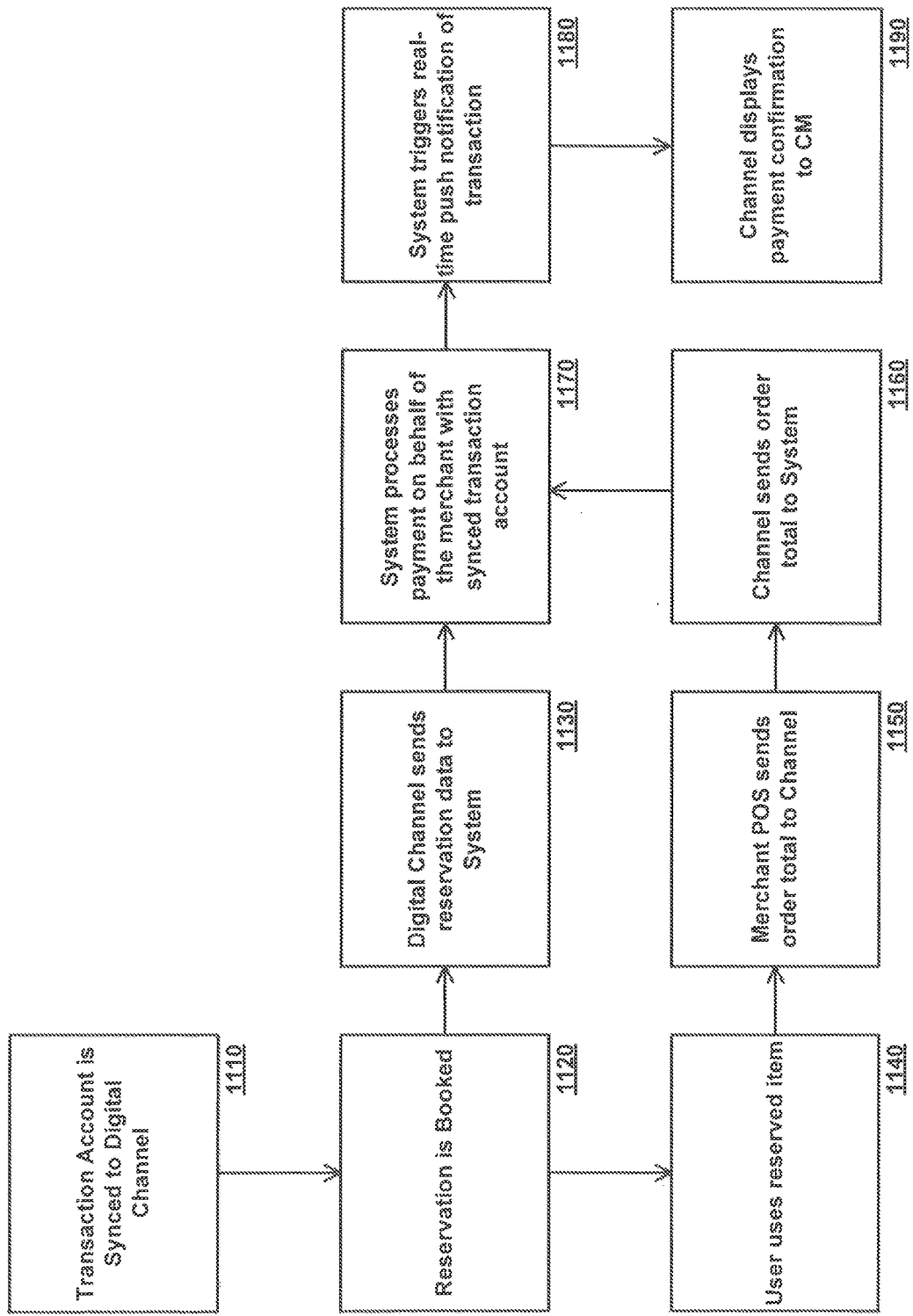
FIG. 11 shows an overview of an item reservation and payment process, in accordance with various embodiments.

In various embodiments and with reference to FIG. 11, system 1100 may be configured as an item reservation and/or purchasing service. System 1100 may be capable of reserving a service and/or processing payment for the reserved service. In these embodiments, a transaction account may be synced with a digital channel as described herein (e.g., according to the process described with respect to FIG. 2). The digital channel may be a digital channel that is capable of reserving an item. For example, the digital channel may be a service reservation channel such as Open Table or any other suitable item reservation service. A user may reserve an item through the digital channel (Step 1120). The digital channel may provide the reservation information for the item to system 1100 (Step 1130). This reservation information may include one or more parameters including for example, a merchant, an item, an item category, a transaction account identifier, a date, a time, a location, and/or the like. The system may create and/or associate a unique identifier with the request such that the user, system, channel, or a third party can access the reservation and associated reservation and/or item information with the unique identifier.

The user may use the reserved item (Step 1140). In response to the user using the reserved item, the merchant POS may send a charge associated with the use of the item to the channel (Step 1150). The channel may then provide the charge to the system, a transaction account issuer (e.g., the transaction account system 120), or any other suitable party (Step 1160). In response to the charge being provided, the system, the transaction account issuer, or the third party may process payment (e.g., initiate a transaction associated with the synced transaction account) for the charge (Step 1170).

System 1100 may further evaluate transaction information associated with the payment to determine whether the payment corresponds with an activity associated with the transaction account. In this way, system 110 may function as a fraud detection system. More specifically, system 1100 may compare the transaction information associated with the purchase to reservation information associated with the reservation information associated with a synced transaction account. Where the transaction details comply with the reservation information, system 110 may authorize the transaction. Moreover, where the transaction information corresponds to an item associated with the reservation, system 110 may request a review of the item as described herein. System 1100 may further associated transaction information or provide an indication of a spend verification based on the transaction information and the associated item reservation information. System 1100 may also determine that transaction information is not associated with or contradicts reservation information. In response to the discrepancy, system 1100 may not authorize a transaction. The failure to authorize a charge to the transaction account may be based on a failure of the transaction to comply with business rules (e.g., the transaction information does not correspond to the reservation information).

System 1100 may further trigger a real-time (based on the transaction initiation) notification, or the transaction to the user (1180). The notification may be provided through any suitable channel. For example, the notification may be provided to the user through the digital channel (Step 1190). The notification may be provided through an application on an electronic device (e.g., a Smartphone) or any other suitable channel and/or device.

Figure 12:
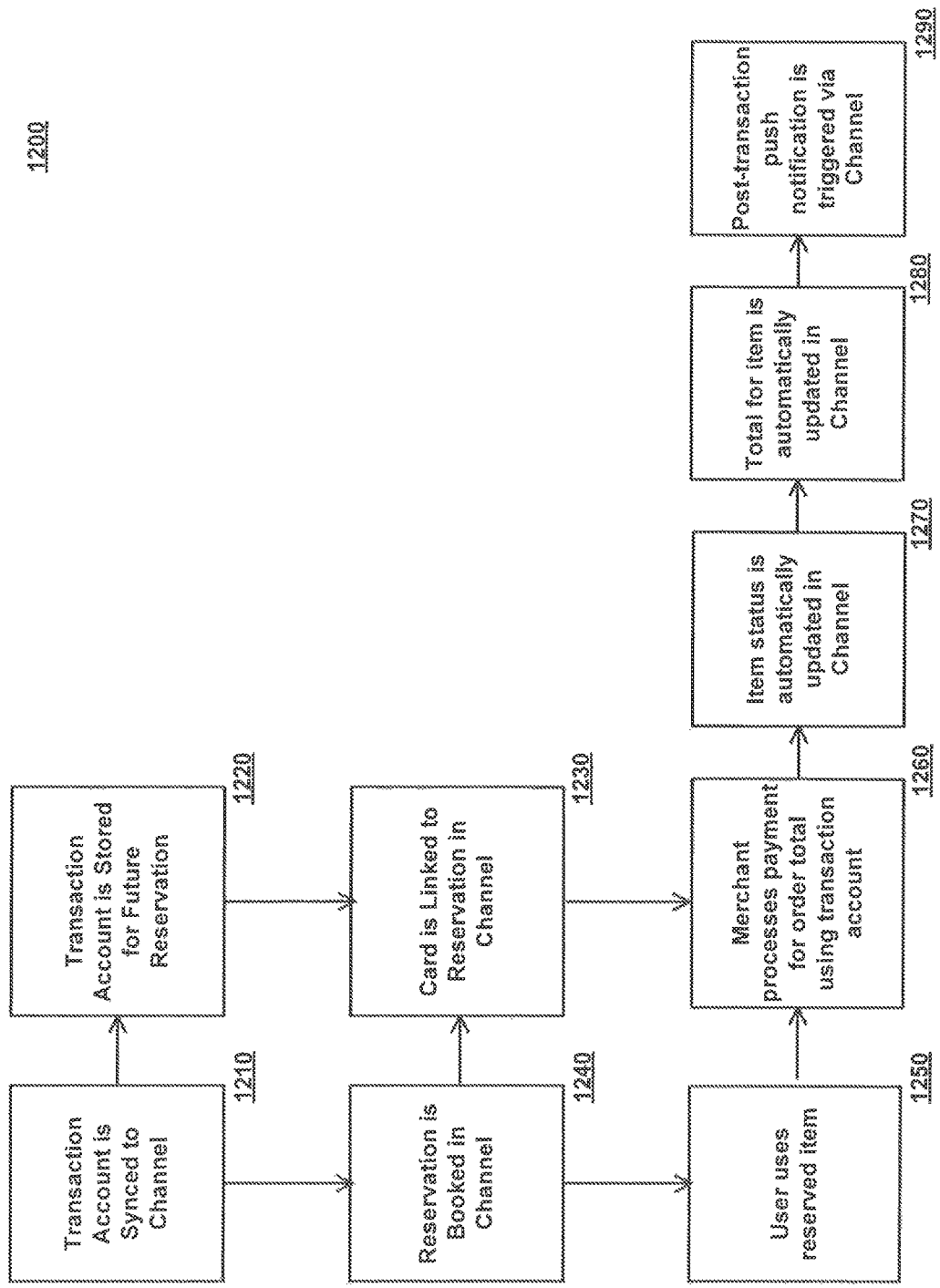
FIG. 12 shows an overview of an item reservation and payment process, in accordance with various embodiments.

In various embodiments and with reference to FIG. 12, system 1200 may be capable of reserving an item and initiating payment for the reserved payment in response the item being used. In various embodiments, a transaction account may be synced with a digital channel through any suitable process including those processes described herein (1210) including, for example, the process described with reference to FIG. 2. System 1200 may be capable of storing the transaction account information for a future reservation for an item (Step 1220). The transaction information may be stored by system 1200, the digital channel, the transaction account system, or any suitable third party. Moreover, the transaction account information may be stored in any suitable format such that it is secure and/or encrypted as described herein. In various embodiments, the user may book a reservation for an item in a digital channel (Step 1240). If the user associated with the reservation has a digital channel account that is synced to a transaction account, the transaction account may be synced with the reservation (Step 1230). The transaction account that is synced may have been previously stored by system 1200, the digital channel, and/or a third party as noted in Step 1220.

A user may use the reserved item (Step 1250), associated with the reservation. Moreover, the merchant providing the item may process a payment for the item using the synced transaction account (Step 1260) associated with the reservation and/or the digital channel used to make the reservation. In various embodiments, any suitable entity may process the transaction for the item. For example, a transaction account issuer may be directly or indirectly (e.g., through the digital channel) linked to a payment processor. Based on the stored transaction account information associated with the reservation, system 1200 or another suitable system may initiate and/or complete payment for a reserved item in response to the user using the item.

Where the item used by the user associated with the reservation was previously associated with a digital channel, the status of the item may be updated based on the use in the digital channel (Step 1270). As such, the inventory for the item may be adjusted accordingly by system 1200 as described herein. The use of the item associated with the reservation and/or the charge associated with the use may also cause the total charge for the item to be automatically updated in the digital channel (Step 1280). Moreover, a post-transaction notification may be sent to the user (Step 1290). The notification may be sent through the digital channel associated with the reservation, the channel associated with the transaction, or any other suitable channel described herein.

Figure 13:
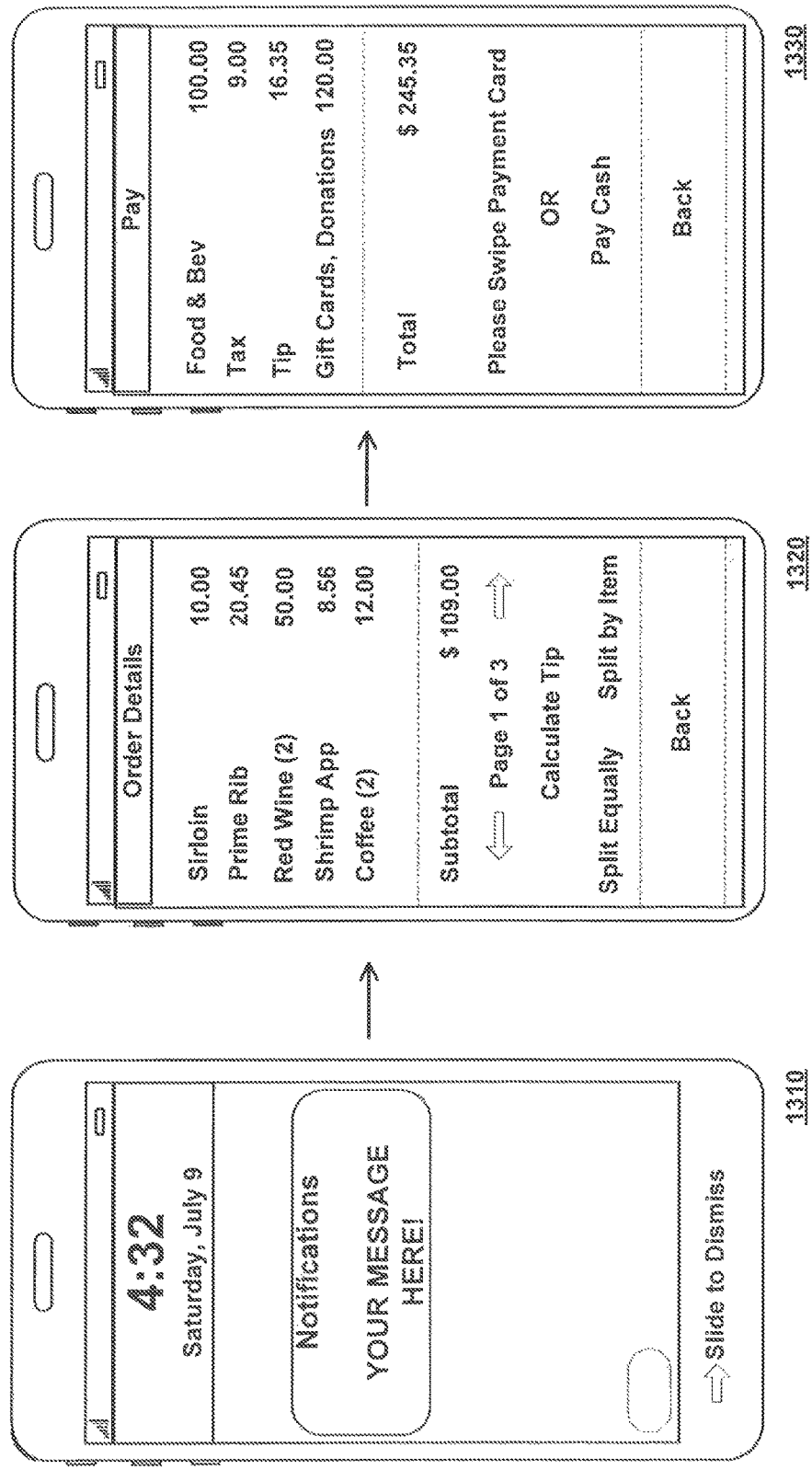
FIG. 13 shows an exemplary notification, payment terms for one or more items, and payment confirmation for the one or more items on an electronic device, in accordance with various embodiments.

For example, in various embodiments and with reference to FIG. 13, an electronic device associated with system 1200 or web client 110 may be capable of receiving a notification 1310. The electronic device may further be configured with at least a portion of the digital channel and/or system 1200, such that the electronic device is capable of listing one or more transaction details associated with the use of the item associated with the reservation. Moreover, the electronic device may be capable of performing other function including, for example, calculating a tip associated with the charges for an item, determining delivery costs, determining costs for fees associated with an item, and/or the like as shown in electronic device 1320. Moreover, as shown in electronic device 1330, system 1200 may provide electronic device 1330 with the option to pay with the synced transaction account associated with the channel. System 1200 may also be capable of presenting alternative payment options (e.g., a pay with cash button). These alternative payment options may be communicated to the merchant associated with the reservation and/or used item and may adjust and/or satisfy the amount due for the item.

As such, the systems described herein facilitate purchases in digital channels. The systems described herein further facilitate monitor and rewarding activities or accomplishments in a digital channel. The systems described herein further facilitate confirmation or verification of activities in digital channels based on transaction information.

Any communication, transmission and/or channel discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, Facebook, Twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/3000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g., WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMacs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/3000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 200 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (3002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the MST's (National Institute of Standards and Technology) definition of cloud computing at http://csrc.nist.gov/publications/nistpubs/900-145/SP900-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify, lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8835; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (3003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, loop-up tables, and the like, which may carry out a variety of functions under the control of one or more microprocessors or other control devices. Similarly, the software elements of the system may be implemented with any programming or scripting language such as C, C++, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code in C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The hank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® an the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the thrill of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for perforating the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to tall outside the scope of patentable subject matter under 35 U.S.C. §101.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data, Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filling station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end, Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
presenting, by a computer based system, a plurality of selectable channels to a user system of a user;
syncing, by the computer based system, a financial transaction account associated with the user with one or more channels of the plurality of selectable channels selected by the user,
wherein the syncing is in response to the user system providing an account code for the financial transaction account to the computer based system;
receiving, by the computer based system and from the channel, reservation information representative of a reservation of an item from a merchant system;
associating, by the computer based system and in response to the receiving, a unique identifier with the reservation information;
enabling, by the computer based system and in response to the associating, access to the reservation information by using the unique identifier,
wherein the reservation information is accessible by a user system, the computer based system, the channel and a third party by using the unique identifier;
synching, by the computer based system and in response to the receiving, the reservation information with the financial transaction account,
wherein the reservation is created in the channel based on an action in the channel, and
wherein a channel profile associated with the action is associated with the financial transaction account;
creating, by the computer based system, reservation instructions for the item that indicate that the item is reserved as a reserved item for the user associated with the channel profile and the financial transaction account,
wherein the reservation instructions indicate that the item is unavailable to other users, and
wherein the channel modifies a listing of inventory to show that the item is unavailable; monitoring, by the computer based system and via the channel, a status of the reserved item;
receiving, by the computer based system and in response to an indication that the reserved item was used, purchase instructions with a request to initiate a payment within the channel,
wherein the purchase instructions and the request to initiate payment is provided by the merchant system through the channel and to the computer based system,
generating, by the computer based system, release instructions for the item in response to the receiving the request to initiate the payment,
wherein the channel modifies the listing of inventory to show that the item is available;
evaluating, by the computer based system, the purchase instructions received through the channel, the request to initiate payment received through the channel, the financial transaction account synched with the channel and the reservation instructions received through the channel;
confirming, by the computer based system and based on the evaluating, that the purchase instructions comply with the reservation instructions;
requesting, by the computer based system, a review of the reserved item;
confirming, by the computer based system and in response to the requesting, that the reserved item conforms to the reservation information and the financial transaction account;
initiating, by the computer based system and based on the confirming that the purchase instructions comply and based on the confirming that the reserved item conforms, a financial transaction in response to the indication that the reserved item has been used and the receiving the financial transaction information.

2. The method of claim 1, further comprising providing alternative payment options and adjusting the financial transaction based on the alternative payment options.

3. The method of claim 1, further comprising syncing, by the computer based system, the financial transaction account and the channel profile based on an input by the user in the channel.

4. The method of claim 1, wherein the reservation is provided to the merchant system and a financial transaction account issuer system.

5. The method of claim 1, wherein a merchant point of sale operatively communicates with the channel.

6. The method of claim 1, wherein an input to the channel from the merchant system changes a status of the reserved item to at least one of open or closed.

7. The method of claim 6, wherein the financial transaction information is generated in response to the status of the reserved item being closed.

8. The method of claim 1, wherein the user system is presented with the financial transaction information through the channel.

9. The method of claim 8, wherein the user system is presented with financial transaction account information through the channel.

10. The method of claim 9, wherein the channel is accessible through a portable electronic device.

11. The method of claim 8, wherein the user system initiates the financial transaction with the financial transaction account associated with the channel based on an input from the user system in the channel.

12. The method of claim 6, wherein the financial transaction is automatically initiated on the financial transaction account associated with the channel in response to the status of the reserved item being closed.

13. The method of claim 6, wherein a review of the reserved item is requested in response to the reserved item being closed.

14. The method of claim 13, wherein the financial transaction verifies the review provided by the user system.

15. The method of claim 1, wherein the channel is configured to determine an inventory of items in response to receiving the reservation information.

16. The method of claim 1, wherein a channel provider transmits in real-time and via the channel a notification to the user system of the financial transaction information.

17. The method of claim 1, wherein the computer based system is administered by a financial transaction account issuer.

18. The method of claim 1, wherein the price of the item is adjusted in response to an indication that the reserved item was used.

19. A non-transitory computer program product having computer-executable instructions stored thereon that, if executed by a computer based system, causes the computer based system to be capable of performing operations comprising:

presenting, by the computer based system, a plurality of selectable channels to a user system of a user;

syncing, by the computer based system, a financial transaction account associated with the user with one or more channels of the plurality of selectable channels selected by the user,
wherein the syncing is in response to the user system providing an account code for the financial transaction account to the computer based system;

receiving, by the computer based system and from the channel, reservation information representative of a reservation of an item from a merchant system;

associating, by the computer based system and in response to the receiving, a unique identifier with the reservation information;

enabling, by the computer based system and in response to the associating, access to the reservation information by using the unique identifier,
wherein the reservation information is accessible by a user system, the computer based system, the channel and a third party by using the unique identifier;

synching, by the computer based system and in response to the receiving, the reservation information with the financial transaction account,
wherein the reservation is created in the channel based on an action in the channel, and
wherein a channel profile associated with the action is associated with the financial transaction account;

creating, by the computer based system, reservation instructions for the item that indicate that the item is reserved as a reserved item for the user associated with the channel profile and the financial transaction account,
wherein the reservation instructions indicate that the item is unavailable to other users, and
wherein the channel modifies a listing of inventory to show that the item is unavailable; monitoring, by the computer based system and via the channel, a status of the reserved item;

receiving, by the computer based system and in response to an indication that the reserved item was used, purchase instructions with a request to initiate a payment within the channel,
wherein the purchase instructions and the request to initiate payment is provided by the merchant system through the channel and to the computer based system, generating, by the computer based system, release instructions for the item in response to the receiving the request to initiate the payment,
wherein the channel modifies the listing of inventory to show that the item is available;

evaluating, by the computer based system, the purchase instructions received through the channel, the request to initiate payment received through the channel, the financial transaction account synched with the channel and the reservation instructions received through the channel;

confirming, by the computer based system and based on the evaluating, that the purchase instructions comply with the reservation instructions;

requesting, by the computer based system, a review of the reserved item;

confirming, by the computer based system and in response to the requesting, that the reserved item conforms to the reservation information and the financial transaction account;

initiating, by the computer based system and based on the confirming that the purchase instructions comply and based on the confirming that the reserved item conforms, a financial transaction in response to the indication that the reserved item has been used and the receiving the financial transaction information.

20. A computer based system, comprising:

a processor;

a non-transitory memory configured to communicate with the processor, the non-transitory memory having instructions stored thereon that, in response to execution by the processor, cause the processor to perform operations comprising:

presenting, by the processor, a plurality of selectable channels to a user system of a user;

syncing, by the processor, a financial transaction account associated with the user with one or more channels of the plurality of selectable channels selected by the user,
wherein the syncing is in response to the user system providing an account code for the financial transaction account to the processor;

receiving, by the processor and from the channel, reservation information representative of a reservation of an item from a merchant system;

associating, by the processor and in response to the receiving, a unique identifier with the reservation information;

enabling, by the processor and in response to the associating, access to the reservation information by using the unique identifier,
wherein the reservation information is accessible by a user system, the processor, the channel and a third party by using the unique identifier;

synching, by the processor and in response to the receiving, the reservation information with the financial transaction account,
wherein the reservation is created in the channel based on an action in the channel, and
wherein a channel profile associated with the action is associated with the financial transaction account;

creating, by the processor, reservation instructions for the item that indicate that the item is reserved as a reserved item for the user associated with the channel profile and the financial transaction account,
wherein the reservation instructions indicate that the item is unavailable to other users, and
wherein the channel modifies a listing of inventory to show that the item is unavailable; monitoring, by the processor and via the channel, a status of the reserved item;

receiving, by the processor and in response to an indication that the reserved item was used, purchase instructions with a request to initiate a payment within the channel,
   wherein the purchase instructions and the request to initiate payment is provided by the merchant system through the channel and to the processor, generating, by the processor, release instructions for the item in response to the receiving the request to initiate the payment,
   wherein the channel modifies the listing of inventory to show that the item is available;

evaluating, by the processor, the purchase instructions received through the channel, the request to initiate payment received through the channel, the financial transaction account synched with the channel and the reservation instructions received through the channel;

confirming, by the processor and based on the evaluating, that the purchase instructions comply with the reservation instructions;

requesting, by the processor, a review of the reserved item;

confirming, by the processor and in response to the requesting, that the reserved item conforms to the reservation information and the financial transaction account;

initiating, by the processor and based on the confirming that the purchase instructions comply and based on the confirming that the reserved item conforms, a financial transaction in response to the indication that the reserved item has been used and the receiving the financial transaction information.

\* \* \* \* \*